United States Patent
Kim et al.

(10) Patent No.: US 11,733,798 B2
(45) Date of Patent: Aug. 22, 2023

(54) TOUCH SENSING SYSTEM AND DISPLAY SYSTEM INCLUDING THE SAME

(71) Applicant: SAMSUNG ELECTRONICS CO., LTD., Suwon-si (KR)

(72) Inventors: Minsung Kim, Seoul (KR); Sanho Byun, Seoul (KR); Roots Huang, New Taipei (TW); Yao Sheng Liang, Hsinchu County (TW); Jungmoon Kim, Seoul (KR); Dongjo Park, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/699,728

(22) Filed: Mar. 21, 2022

(65) Prior Publication Data

US 2022/0214794 A1 Jul. 7, 2022

Related U.S. Application Data

(63) Continuation of application No. 16/822,685, filed on Mar. 18, 2020, now Pat. No. 11,307,708.

(30) Foreign Application Priority Data

Jul. 18, 2019 (KR) .................. 10-2019-0086899

(51) Int. Cl.
 *G06F 3/041* (2006.01)
 *G06F 3/044* (2006.01)
(52) U.S. Cl.
 CPC ........ *G06F 3/04166* (2019.05); *G06F 3/0446* (2019.05); *G06F 2203/04107* (2013.01); *G06F 2203/04108* (2013.01)

(58) Field of Classification Search
 CPC ......... G06F 3/041–047; G06F 3/04166; G06F 3/0446; G06F 2203/04107; G06F 2203/041
 See application file for complete search history.

(56) References Cited

U.S. PATENT DOCUMENTS

| 8,411,045 B2 | 4/2013 | Futter |
| 8,878,808 B2 | 11/2014 | Chen et al. |

(Continued)

FOREIGN PATENT DOCUMENTS

| KR | 10-1513037 B1 | 4/2015 |
| KR | 10-2015-0139013 A | 12/2015 |
| KR | 10-1634642 B1 | 6/2016 |

OTHER PUBLICATIONS

Communication dated May 4, 2023, issued by the Korean Intellectual Property Office in Korean Patent Application No. 10-2019-0086899.

*Primary Examiner* — Roy P Rabindranath
(74) *Attorney, Agent, or Firm* — Sughrue Mion, PLLC

(57) ABSTRACT

A touch sensing system is provided. The touch sensing system includes a touch panel including touch sensors arranged in a grid along row and column directions; a touch controller including at least one transmission circuit to transmit a signal to the touch sensors and at least one reception circuit to detect a signal from the touch sensors; and a switching circuit to selectively connect each of the touch sensors to the at least one transmission circuit and the at least one reception circuit in accordance with an operation mode. The switching circuit connects each of the touch sensors to the at least one reception circuit in a touch mode and connects a first portion of the touch sensors to the at least one reception circuit and a second portion of the touch sensors to the at least one transmission circuit in a proximity mode.

19 Claims, 27 Drawing Sheets

(56) References Cited

U.S. PATENT DOCUMENTS

| | | |
|---|---|---|
| 9,274,589 B2 | 3/2016 | Park |
| 9,383,867 B2 | 7/2016 | Hirakawa et al. |
| 9,898,121 B2 | 2/2018 | Shahparnia et al. |
| 2012/0127124 A1* | 5/2012 | Zanone ................. G06F 3/0446 345/174 |
| 2013/0271396 A1* | 10/2013 | Chen ................... G06F 3/04166 345/173 |
| 2014/0247239 A1* | 9/2014 | Jamshidi-Roudbari ...................... G06F 3/0447 345/174 |
| 2016/0179251 A1 | 6/2016 | Lee et al. |
| 2016/0179273 A1 | 6/2016 | Lee et al. |
| 2016/0188040 A1 | 6/2016 | Shin et al. |
| 2016/0357317 A1 | 12/2016 | Kim et al. |
| 2016/0366273 A1* | 12/2016 | Kobayashi ............ G06F 3/0488 |
| 2017/0003792 A1 | 1/2017 | Berget et al. |
| 2017/0177159 A1 | 6/2017 | Cao et al. |
| 2017/0192555 A1 | 7/2017 | Li et al. |
| 2017/0300163 A1 | 10/2017 | Huang et al. |
| 2018/0018037 A1 | 1/2018 | Tan |
| 2018/0113559 A1 | 4/2018 | Bae et al. |
| 2018/0129090 A1* | 5/2018 | Tsai ..................... G02F 1/1368 |
| 2018/0136769 A1 | 5/2018 | Naganuma |
| 2018/0364869 A1* | 12/2018 | Lee ....................... G06F 3/0421 |
| 2020/0366290 A1 | 11/2020 | Abe |

* cited by examiner

TOUCH SENSING SYSTEM AND DISPLAY SYSTEM INCLUDING THE SAME

CROSS-REFERENCE TO RELATED APPLICATION

This is a Continuation application of U.S. application Ser. No. 16/822,685 filed Mar. 18, 2020, now U.S. Pat. No. 11,307,708 issued Apr. 19, 2022, which claims priority from Korean Patent Application No. 10-2019-0086899 filed on Jul. 18, 2019 in the Korean Intellectual Property Office, the disclosure of which is incorporated herein by reference in its entirety.

BACKGROUND

Methods and apparatuses consistent with example embodiments relate to a touch sensing system, and a display system including the same.

Touch and display driver integration (TDDI) refers to a technology that integrates a touch integrated circuit (IC) and a display driver IC (DDI) in a single chip.

A capacitive touch sensing device may recognize a touch input using a change in capacitance. The capacitive method may be a self-capacitive method or a mutual capacitive method. The self-capacitive method may sense a change in capacitance occurring in an electrode for touch recognition, and the mutual capacitive method may sense a change in capacitance generated between a driving electrode receiving separate driving signals and a sensing electrode.

SUMMARY

One or more example embodiments provide a touch sensing system capable of performing proximity sensing for sensing proximity of an object without using a separate proximity sensor.

According to an aspect of an embodiment, a touch sensing system includes a touch panel including touch sensors arranged in a grid along a row direction and a column direction that crosses the row direction; a touch controller including at least one transmission circuit configured to transmit an output voltage signal to the touch sensors, and at least one reception circuit configured to detect an input voltage signal from the touch sensors; a switching circuit configured to selectively connect each of the touch sensors to the at least one transmission circuit and the at least one reception circuit in accordance with an operation mode; and a plurality of routing wires configured to electrically connect each of the touch sensors to the switching circuit. The switching circuit is further configured to: connect each of the touch sensors to the at least one reception circuit in a touch mode, the touch mode sensing a touch of an object, and connect a first portion of the touch sensors to the at least one reception circuit and a second portion of the touch sensors to the at least one transmission circuit in a proximity mode, the proximity mode sensing proximity of the object.

According to an aspect of an embodiment, a touch sensing system includes a touch panel including touch sensors arranged in a grid along a row direction and a column direction that crosses the row direction; and a touch controller configured to electrically connect at least two touch sensors adjacent to each other, among the touch sensors, and connect the at least two touch sensors to a proximity sensing receiver. The proximity sensing receiver is configured to sense proximity of an object using the at least two touch sensors.

According to an aspect of an embodiment, a display system includes a display panel including touch sensors arranged in a grid along a row direction and a column direction that crosses the row direction; and a controller configured to control the display panel to sense a touch of an object using the touch sensors in a touch mode and sense proximity of the object using a portion of the touch sensors in a proximity mode. The controller is further configured to control the display panel to selectively activate the touch mode and the proximity mode based on a first event occurring.

BRIEF DESCRIPTION OF DRAWINGS

The above and other aspects, features, and advantages of the present disclosure will be more clearly understood from the following detailed description, taken in conjunction with the accompanying drawings, in which:

FIGS. 14A, 14B, 14C, 14D, 14E, 14F and 14G are views illustrating a proximity sensing operation of a touch sensing device according to an embodiment.

DETAILED DESCRIPTION

Figure 1:
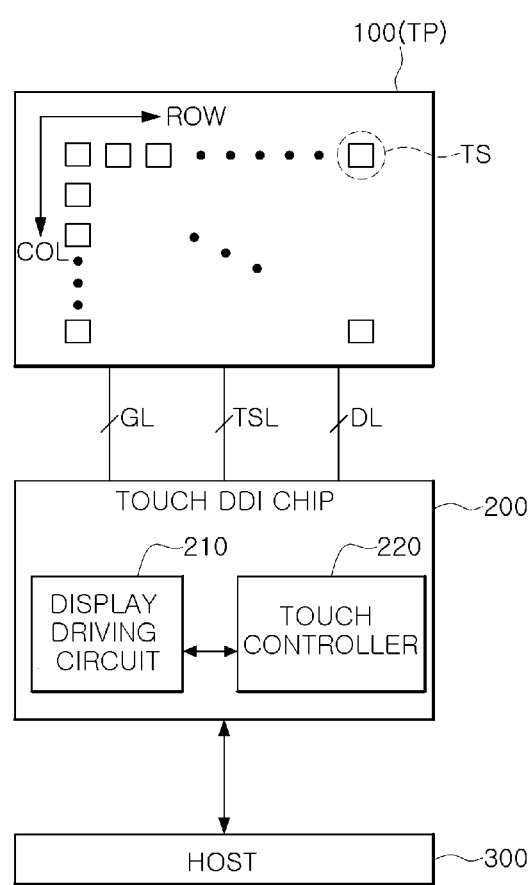
FIG. 1 is a block diagram illustrating a display system according to an embodiment.

Hereinafter, embodiments will be described with reference to the accompanying drawings. The present disclosure may, however, be embodied in many different forms and should not be construed as limited to the embodiments set forth herein. Like reference numerals refer to like elements throughout this application. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a block diagram illustrating a display system according to an embodiment. Referring to FIG. 1, a display system 10 may include a touch display panel 100, a touch display driving integrated circuit (touch DDI) chip 200, and a host 300. The display system 10 may be a touch display system having a touch function.

The touch display panel 100 may include a touch panel TP therein. The touch panel TP may include a plurality of touch sensors TS. As an example, the touch sensors TS may be provided by a common electrode that is included in the touch display panel 100 and receives a common voltage VCOM for driving the display, a separate electrode different from the common electrode, or the like. For example, the plurality of touch sensors TS may be arranged in a grid along a row direction ROW and a column direction COL crossing the row direction ROW.

The display system 10 may be an in-cell type touch display system or an on-cell type touch display system.

In an on-cell type touch display panel 100, a plurality of touch sensors TS may be arranged on a display panel. For example, in the on-cell type touch display system, touch sensors TS may be provided by separate electrodes disposed on an upper substrate of the display panel.

In an in-cell type touch display panel 100, a plurality of pixels and a plurality of touch sensors TS may be arranged within the same panel. For example, in the in-cell type touch display system, touch sensors TS may be mounted in the touch display panel 100, together with the plurality of pixels. For example, a touch sensor TS may be provided by a common electrode for driving the plurality of pixels.

A display system 10, including the in-cell type touch display panel 100, may output an image frame according to a predetermined frame period. In an embodiment, one frame period may include a display period for displaying image information, and a touch period for sensing a touch input of an object.

During the display period, the touch sensors TS may be used as a common electrode for driving a plurality of pixels. Therefore, a common voltage may be applied to the touch sensors TS during the display period.

During the touch period, the touch sensors TS may be used as an electrode for sensing a touch input. Therefore, a touch sensing signal, corresponding to the change in capacitance may be output from the touch sensor TS during the touch period.

The touch display panel 100 may include a display panel such as a liquid crystal display panel, an organic light emitting display panel, or the like, but is not limited thereto.

The touch display panel 100 may be driven by the touch DDI chip 200. The touch DDI chip 200 may be connected to the touch display panel 100 through gate lines GL, data lines DL, and touch sensing lines TSL. The touch DDI chip 200 may include a display driving circuit 210 and a touch controller 220.

The display driving circuit 210 may generate signals for driving a plurality of pixels. The display driving circuit 210 may be connected to the plurality of pixels through the gate lines GL and the plurality of data lines DL, respectively. The display driving circuit 210 may provide a gate signal for driving the gate lines GL of the touch display panel 100. The display driving circuit 210 may provide an image signal to each of the plurality of pixels through the data lines DL.

The touch controller 220 may generate signals for sensing a touch input. The touch controller 220 may be connected to the touch sensors TS through the touch sensing lines TSL, respectively. The touch controller 220 may acquire a touch sensing signal corresponding to a change in capacitance occurred in the touch sensors TS through the touch sensing lines TSL. The touch controller 220 may sense the touch input using the touch sensing signal.

According to an embodiment, the touch controller 220 and the display driving circuit 210 may be implemented as a single semiconductor chip. However, embodiments are not limited thereto, and the touch controller 220 and the display driving circuit 210 may be implemented as separate semiconductor chips.

The touch DDI chip 200 may communicate with the host 300. For example, the host 300 may be a main processor that controls the entire operation of an electronic device on which the touch display panel 100 and the touch DDI chip 200 are mounted, and may implemented as an application processor (AP), a central processing unit (CPU), or the like. The touch DDI chip 200 may control display of an image on the touch display panel 100 according to data received from the host 300. Also, the touch DDI chip 200 may provide the host 300 with information on the touch input sensed by the touch display panel 100.

According to an embodiment, the display system 10 may provide a proximity sensing function for sensing proximity of an object not in direct contact with the touch display panel 100. For example, in an embodiment, the proximity sensing function may be implemented by electrically connecting and grouping at least a portion of the touch sensors included in the touch display panel 100. Because the proximity sensing function is implemented without a proximity sensor, a full screen display capable of displaying an image the entire screen of an electronic device may be implemented.

Figure 2:
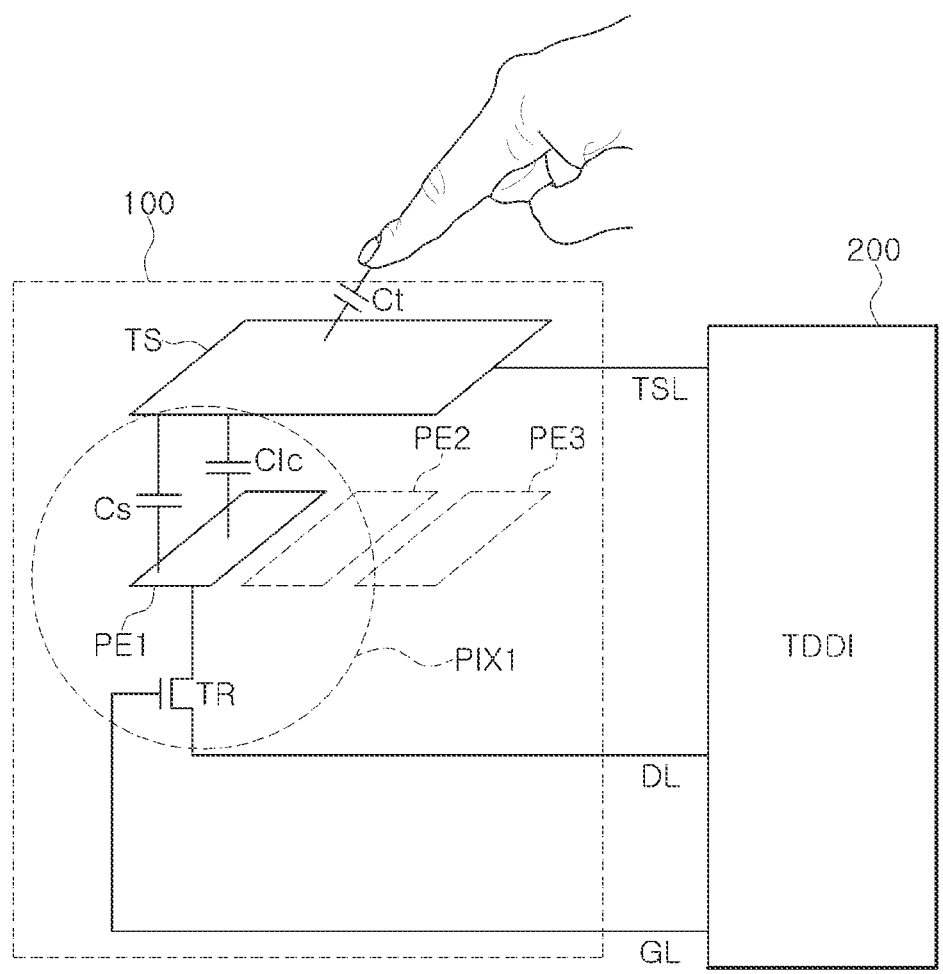
FIG. 2 is a view illustrating an operation of a display system according to an embodiment.

FIG. 2 is a view illustrating an operation of a display system according to an embodiment. Referring to FIG. 2, a touch sensor TS may be disposed on a touch display panel 100, and a plurality of pixels may be disposed below one touch sensor TS. For example, one touch sensor TS may have a larger area than one pixel (e.g., PIX1). The touch sensor TS may be one among a plurality of touch sensors.

A first pixel PIX1 may include a first pixel electrode PE1 and a transistor TR. In a display period, one touch sensor TS may be used as a common electrode for driving the plurality of pixels. The image information may be displayed according to a difference in voltage between the one touch sensor TS used as the common electrode and pixel electrodes PE1, PE2, and PE3.

The transistor TR may be a thin film transistor (TFT). The transistor TR of the first pixel PIX1 may be connected to a gate line GL and a data line DL. A source of the transistor TR may be connected to a touch DDI chip 200 through the data line DL, a drain of the transistor TR may be connected to the first pixel electrode PE1, and a gate of the transistor TR may be connected to the touch DDI chip 200 through the gate line GL.

A storage capacitor Cs and a liquid crystal layer may be disposed between the first pixel electrode PE1 and the touch sensor TS. A liquid crystal capacitor Clc may be formed between the first pixel electrode PE1 and the touch sensor TS by the liquid crystal layer. The liquid crystal capacitor Clc may be connected to the storage capacitor Cs in parallel. The storage capacitor Cs may serve to maintain a voltage charged in the liquid crystal capacitor Clc in a state in which the gate of the transistor TR is turned off.

During the display period, the touch DDI chip 200 may provide a common voltage to a touch sensing line TSL connected to the touch sensor TS, may provide a gate signal to a gate line GL, and may provide an image signal to a data line DL. For example, the gate signal may be a signal for controlling a turn-on or a turn-off of the transistor TR included in the pixel PIX1.

For example, in the first pixel PIX1, an electric field may be formed by the image signal received through the data line DL and the common voltage of the touch sensor TS. An arrangement of liquid crystal directors of the liquid crystal layer may be changed by the electric field. According to the arrangement of the liquid crystal directors, light incident on the liquid crystal layer may be penetrated or blocked. Therefore, the display system 10 may display image information through the touch display panel 100.

During the touch period, the touch DDI chip 200 may receive a touch sensing signal output from the touch sensor TS through the touch sensing line TSL. In this case, when an inputting object such as a portion of a user's body touches the touch display panel 100 or approaches the touch display panel 100, capacitance (Ct) may be generated between the touch sensor TS and the inputting object. As the capacitance (Ct) is generated, the touch sensing signal output from the touch sensor TS may be changed. The touch DDI chip 200 may sense a change in the touch sensing signal output from the touch sensor TS through the touch sensing line TSL. The display system 10 may recognize that the inputting object touches the touch display panel 100 or approaches the touch display panel 100 based on a change in the touch sensing signal.

Figure 3:
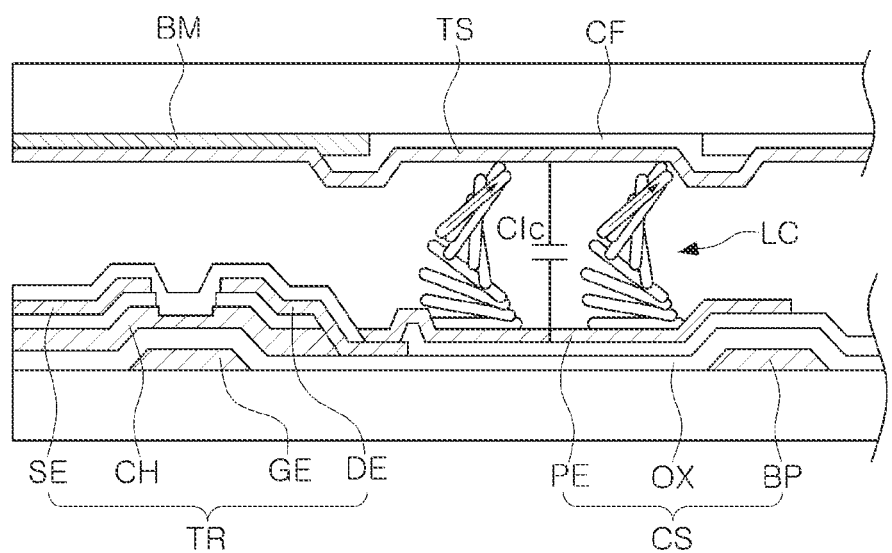
FIG. 3 is a cross-sectional view of a touch display panel according to an embodiment.

FIG. 3 is a cross-sectional view of a touch display panel according to an embodiment. Referring to FIG. 3, a touch display panel 100 may include a transistor TR, a channel region CH, a pixel electrode PE, a liquid crystal layer LC, a touch sensor TS, a color filter CF, a black matrix BM, and a storage capacitor Cs. A liquid crystal capacitor Clc may be formed between the pixel electrode PE and the touch sensor TS by the liquid crystal layer LC.

The transistor TR may include a gate electrode GE, a source electrode SE, and a drain electrode DE. The gate electrode GE may be connected to a gate line, and may receive a gate signal from the gate line. The gate signal may control a turn-on or a turn-off of the transistor TR. The source electrode SE may be connected to a data line, may receive an image signal from the data line, and may transmit the received image signal to the drain electrode DE. The drain electrode DE may be connected to the pixel electrode PE.

The touch sensor TS may be connected to a touch sensing line, may receive a common voltage from the touch sensing line, and may supply the common voltage to each pixel. In the pixel, an electric field may be formed by the image signal received through the data line and the common voltage applied to the touch sensor TS. An arrangement of liquid crystal directors of the liquid crystal layer LC may be changed by the electric field. According to the arrangement of the liquid crystal directors, light incident on the liquid crystal layer LC may be penetrated or blocked.

The color filter CF may be provided to display a color for each pixel. The black matrix BM may serve to distinguish and block light between the color filters CF.

In an embodiment, a display system may output a touch sensing signal, corresponding to a change in capacitance occurred in the touch sensor TS, to a touch sensing line. The display system may recognize that an inputting object approaches the touch display panel 100 based on a change in the touch sensing signal.

Figure 4:
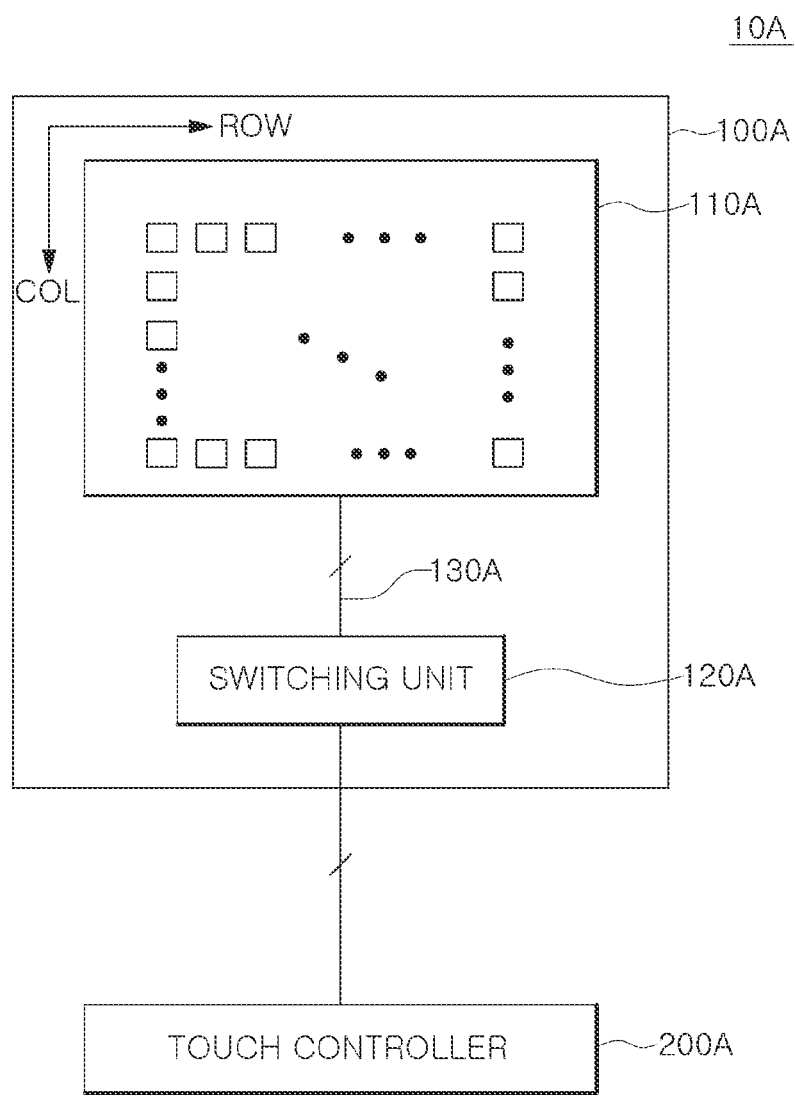
FIG. 4 is a block diagram illustrating a touch sensing system according to an embodiment.

FIG. 4 is a block diagram illustrating a touch sensing system according to an embodiment. Referring to FIG. 4, a touch sensing system 10A may include a touch sensing device 100A and a touch controller 200A. The touch sensing device 100A may include a touch panel 110A, a switching unit 120A, and routing wires 130A.

A plurality of touch sensors TS may be arranged on the touch panel 110A. For example, the touch sensors TS may be arranged in a row direction ROW and a column direction COL crossing the row direction ROW.

The touch controller 200A may include at least one transmission circuit and at least one reception circuit. The at least one transmission circuit may output a voltage signal to the touch sensors TS. The at least one reception circuit may detect the voltage signal from the touch sensors TS.

One end of the routing wires 130A may be connected to each of the touch sensors TS, and the other end of the routing wires 130A may be connected to the switching unit 120A. The routing wires 130A may transfer voltage signals from the plurality of touch sensors TS to the switching unit 120A or may transfer voltage signals to the plurality of touch sensors TS.

The switching unit 120A may selectively connect each of the touch sensors TS to the at least one of the transmission circuit and the at least one reception circuit in accordance with an operation mode. For example, the switching unit 120A may connect the touch sensors TS to the at least one reception circuit in a touch mode for sensing direct contact of an object. Depending on an embodiment, in a proximity mode for sensing proximity of an object, the switching unit 120A may connect a portion of the touch sensors TS to the at least one reception circuit, and a remainder of the touch sensors TS to the at least one transmission circuit.

According to an embodiment, the touch sensing device 100A may be implemented as an in-cell type, and the touch sensing system 10A may sense a touch input based on a self-capacitive method. Further, in an embodiment, the switching unit 120A may implement a proximity sensing operation for sensing the proximity of the object by individually controlling routings of the touch sensors TS.

Figure 5:
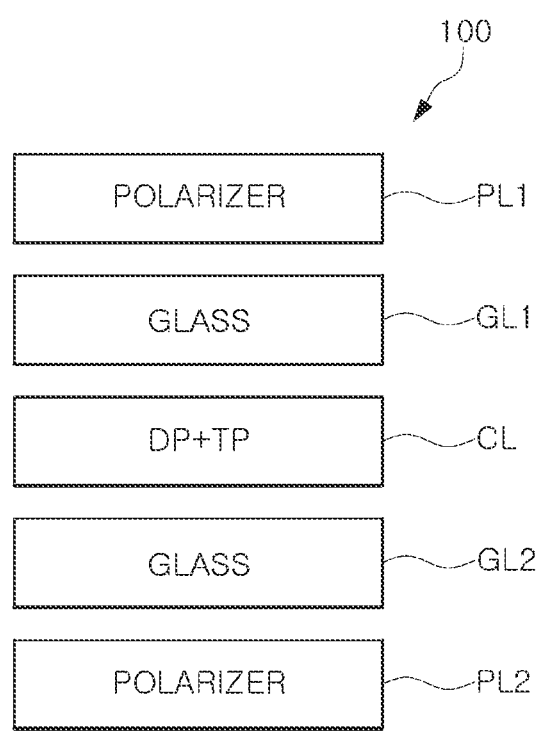
FIG. 5 is a block diagram illustrating an embodiment of an in-cell type touch display panel according to an embodiment.

FIG. 5 is a block diagram illustrating an embodiment of an in-cell type touch display panel according to an embodiment. Referring to FIG. 5, a touch display panel 100 may include polarizers PL1 and PL2, glasses GL1 and GL2, and a display panel DP.

In the in-cell type touch display panel 100, a display panel DP and a touch panel TP for sensing a touch input may be arranged on the same panel. For example, the touch panel TP may be included in a layer CL including the display DP. The in-cell type touch display panel 100 may perform a touch sensing function by using at least a portion of various electrodes provided in the touch display panel 100 as a touch sensor.

For example, the touch sensor may receive a common voltage during a display period, and the touch sensor may output a touch sensing signal during a touch period.

The layer CL including the display panel DP and the touch panel TP may be disposed between the glasses GL1 and GL2. The polarizers PL1 and PL2 may be arranged on the glasses GL1 and GL2, respectively.

Figure 6:
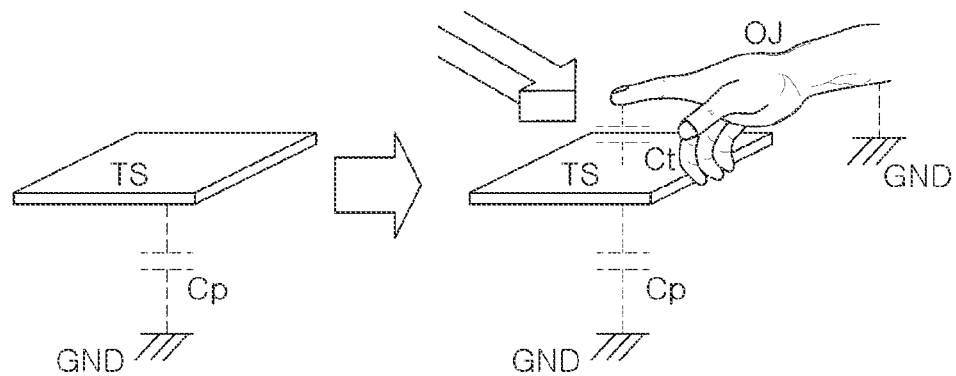
FIGS. 6 and 7 are views illustrating an operation of sensing a touch input according to an embodiment.
Figure 7:
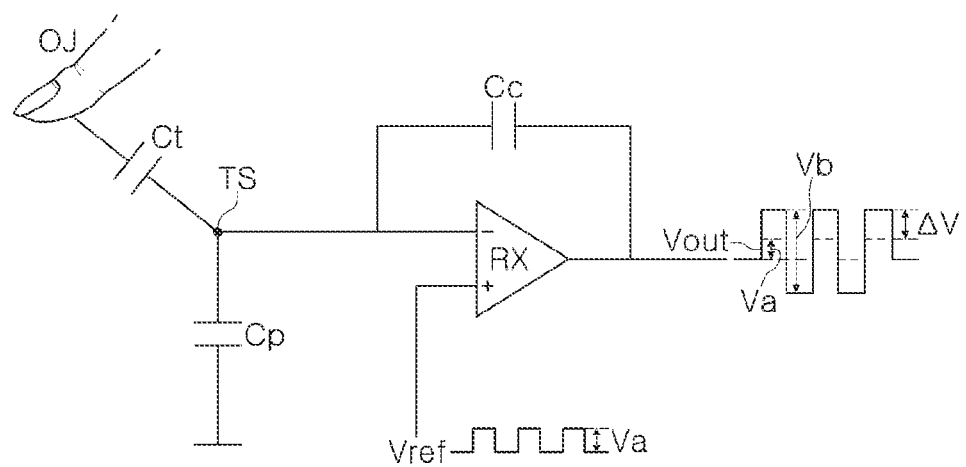

FIGS. 6 and 7 are views illustrating an operation of sensing a touch input according to an embodiment. Referring to FIG. 6, parasitic capacitance (Cp) may be formed between a touch sensor TS and a ground source GND in a touch display panel.

In accordance with a touch input by an object OJ, touch capacitance (Ct) may be formed between the touch sensor TS and the object OJ. In a self-capacitive method, the touch input may be sensed by measuring a magnitude of the touch capacitance (Ct) between the touch sensor TS and the object OJ.

In FIG. 7, a configuration of a reception circuit connected to a touch sensor TS is illustrated. Referring to FIG. 7, the reception circuit connected to the touch sensor TS may include a receiver RX and a feedback capacitor Cc. Parasitic capacitance (Cp) may be formed between the touch sensor TS and a ground source GND in a touch display panel.

A touch sensing signal from the touch sensor TS may be input to a first input terminal (−) of the receiver RX. Various types of reference voltages (Vref) such as a pulse signal may be input to a second input terminal (+) of the receiver RX. The feedback capacitor Cc may be connected between the first input terminal (−) and an output terminal of the receiver RX.

In accordance with a touch input by an object OJ, an electric field may be formed from the touch sensor TS, and touch capacitance (Ct) may be formed between the touch sensor TS and the object OJ. Capacitance of the feedback capacitor Cc may be the sum of the parasitic capacitance (Cp) and the touch capacitance (Ct).

When a reference voltage (Vref) having a first magnitude (Va) is input to the second input terminal (+) of the receiver RX, an output voltage (Vout) having a second magnitude (Vb) may be output to the output terminal of the receiver RX according to the touch capacitance Ct. The second magnitude (Vb) may be greater than the first magnitude (Va). The touch controller may sense the touch input in accordance with a difference (ΔV) between the first magnitude (Va) and the second magnitude (Vb).

In order for the display system to detect proximity of the object, intensity of an electric field should be strong. Because an area of one touch sensor TS is constant, intensity of an electric field generated by one touch sensor TS may be constant even when an area of the object OJ increases. Therefore, even when the object OJ having a relatively large area approaches the touch sensor TS, an amount of the touch capacitance (Ct) formed between the touch sensor TS and the object OJ may be constant. For example, one touch sensor TS may not sense proximity of the object OJ.

Figure 8:
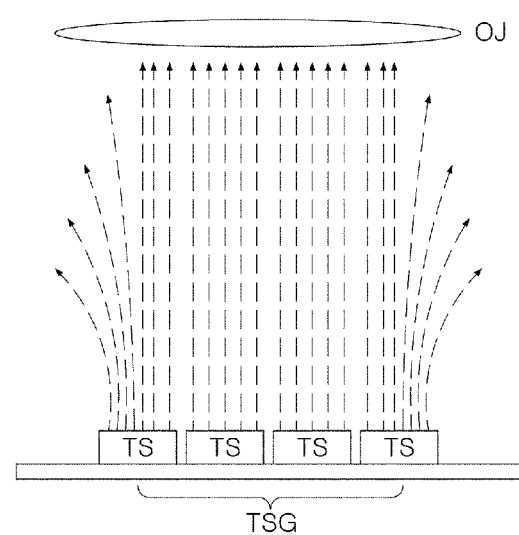
FIG. 8 is a view illustrating a proximity sensing operation according to an embodiment.

FIG. 8 is a view illustrating a proximity sensing operation according to an embodiment. Referring to FIG. 8, in a proximity sensing operation, a display system according to an embodiment may group and electrically connect a plurality of touch sensors TS to form a touch sensor group TSG. Touch sensors TS of the touch sensor group TSG may be commonly connected to a proximity sensing receiver for sensing proximity of an object. As a result, an area of the touch sensor group TSG may be greater than the individual touch sensors TS.

As an area of the touch sensor group TSG is increased, intensity of an electric field generated by one touch sensor group TSG may increase. This may increase a distance at which the touch sensor TS may sense an object OJ. Therefore, the display system may provide a proximity sensing function for sensing proximity of an object, not in direct contact, by grouping the touch sensors TS into a touch sensor group TSG.

Figure 9:
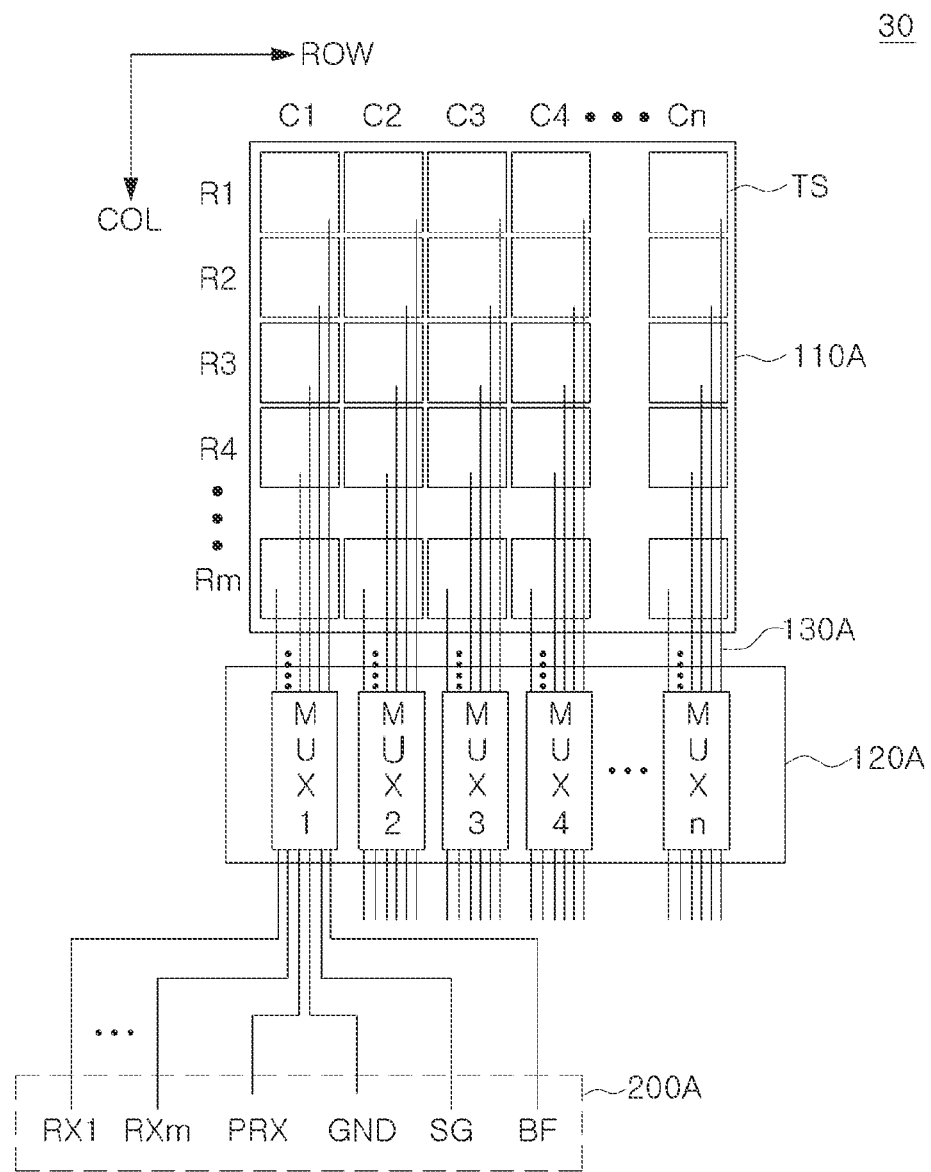
FIG. 9 is a view illustrating a touch sensing system according to an embodiment.

FIG. 9 is a view illustrating a touch sensing system according to an embodiment. Referring to FIG. 9, a touch sensing system 30 may include touch panel 110A, switching unit 120A, and routing wires 130A. The touch panel 110A may be one among a plurality of touch panels 110A.

In the touch panel 110A, touch sensors TS may be arranged in m (m is a natural number of 1 or more) rows and n (where n is a natural number of 1 or more) columns. A plurality of pixels may be arranged under the touch sensor TS.

The switching unit 120A may include n multiplexers MUX1 to MUXn, n corresponds to the number of columns of the touch sensors TS arranged on the touch panel 110A.

Each of the multiplexers MUX1 to MUXn may be connected to the touch sensors TS arranged at the same position in a row direction ROW.

Specifically, m touch sensors TS arranged in a first column C1 of the touch panel 110A may be connected to a first multiplexer MUX1. In addition, m touch sensors TS arranged in a second column C2 of the touch panel 110A may be connected to a second multiplexer MUX2. Further, m touch sensors TS arranged in an $n^{th}$ column Cn of the touch panel 110A may be connected to an $n^{th}$ multiplexer MUXn.

Each of the multiplexers MUX1 to MUXn may be respectively connected to n touch sensing receivers RX1 to RXm, a proximity sensing receiver PRX, a ground source GND for supplying a ground voltage to the touch sensors TS, a voltage source SG for supplying a predetermined voltage, different from the ground voltage, to the touch sensors TS, and a buffer BF. According to an embodiment, each of the multiplexers MUX1 to MUXn may be connected to a common voltage source for supplying a common voltage to the touch sensors TS.

Each of the touch sensing receivers RX1 to RXm may be receivers for sensing a touch input by the object, and may receive a touch sensing signal from the touch sensors TS. The proximity sensing receiver PRX may be receivers for sensing proximity of the object, and may receive a touch sensing signal from the touch sensors TS. The proximity sensing receiver PRX may be substantially the same receiver as each of the touch sensing receivers RX1 to RXm, but may be implemented as different receivers from the touch sensing receivers RX1 to RXm according to an embodiment.

For example, each of the multiplexers MUX1 to MUXn may transmit the touch sensing signals of the touch sensors TS to the corresponding touch sensing receivers RX1 to RXm. For example, a touch sensing signal of the touch sensor TS disposed in a region in which the first column C1 and the first row R1 cross each other may be transferred to the first touch sensing receiver RX1, and a touch sensing signal of the touch sensor TS disposed in a region in which the first column C1 and an $m^{th}$ row Rm cross each other may be transferred to an $m^{th}$ touch sensing receiver RXm.

Each of the touch sensing receivers RX1 to RXm and the proximity sensing receiver PRX may include a first input terminal to receive the touch sensing signal from the touch sensor TS, and a second input terminal to receive a reference voltage.

According to an embodiment, each of the multiplexers MUX1 to MUXn may connect the touch sensors TS to the buffer BF. The buffer BF may supply the reference voltage to the touch sensors TS.

According to an embodiment, each of the multiplexers MUX1 to MUXn may turn off switches connected to each of the touch sensors TS, to float the touch sensors TS. According to an embodiment, each of the multiplexers MUX1 to MUXn may apply a ground voltage or a predetermined voltage, different from the ground voltage, to each of the touch sensors TS.

According to an embodiment, each of the multiplexers MUX1 to MUXn included in the switching unit 120A may independently control routing of each of the touch sensors TS disposed on the touch panel 110A. Therefore, the touch sensing system 30 may electrically connect and group the plurality of touch sensors TS to form a touch sensor group TSG, and may connect the touch sensors TS of the touch sensor group TSG to the proximity sensing receiver PRX in common.

The touch sensors TS of the touch sensor group TSG may be connected to the proximity sensing receiver PRX in common, an area of the touch sensor group TSG may be greater than an area of an individual touch sensor TS. As the area of the touch sensor group TSG is increased, an electric field generated by the touch sensor group TSG is greater than an electric field generated by an individual touch sensor TS. When the electric field generated increases, a distance at which the object OJ may be sensed may increase.

Therefore, the touch sensors TS of the touch sensor group TSG may serve as a proximity sensor for sensing proximity of the object.

Figure 10:
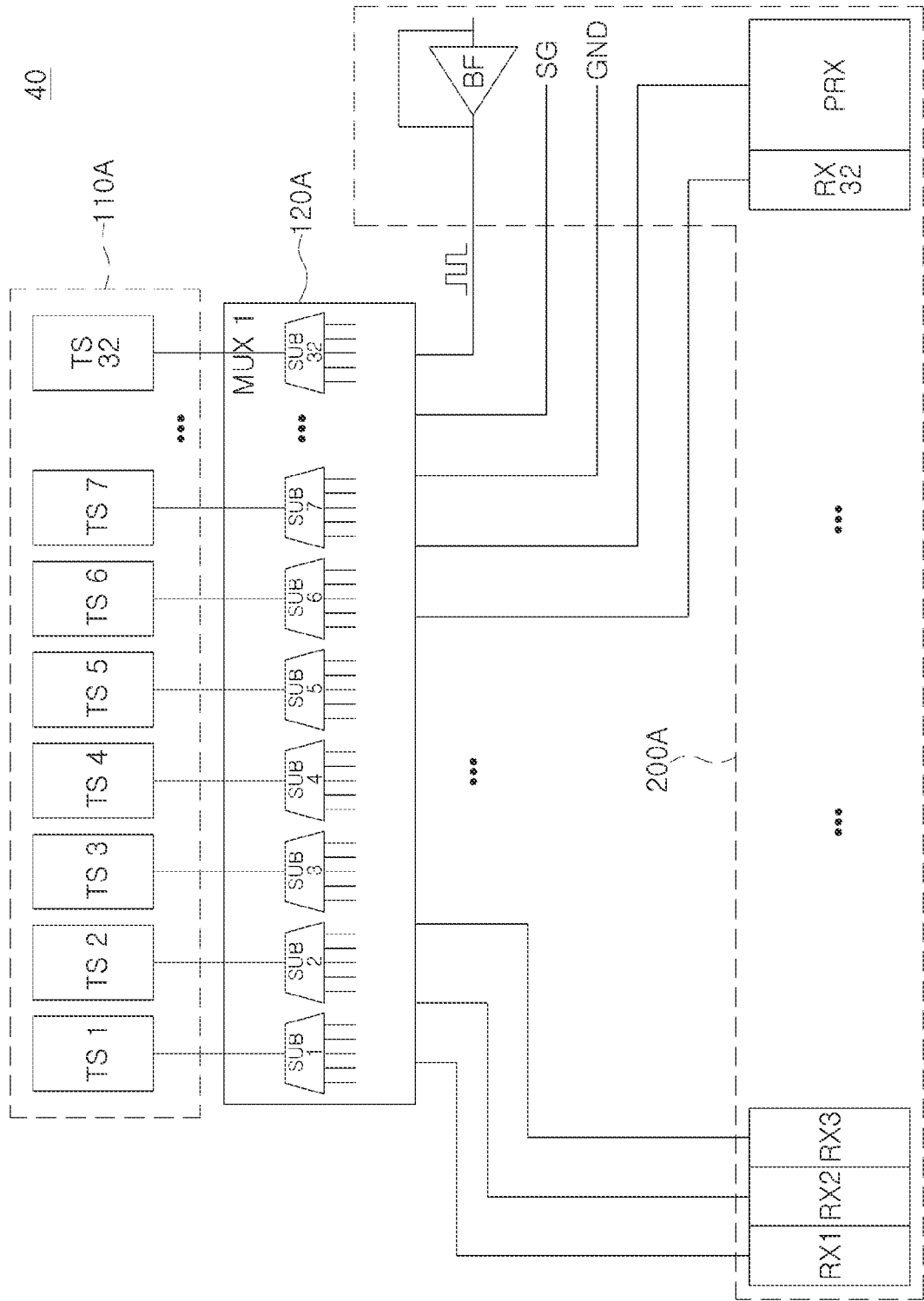
FIGS. 10 and 11 are views illustrating a touch sensing system according to an embodiment.
Figure 11:
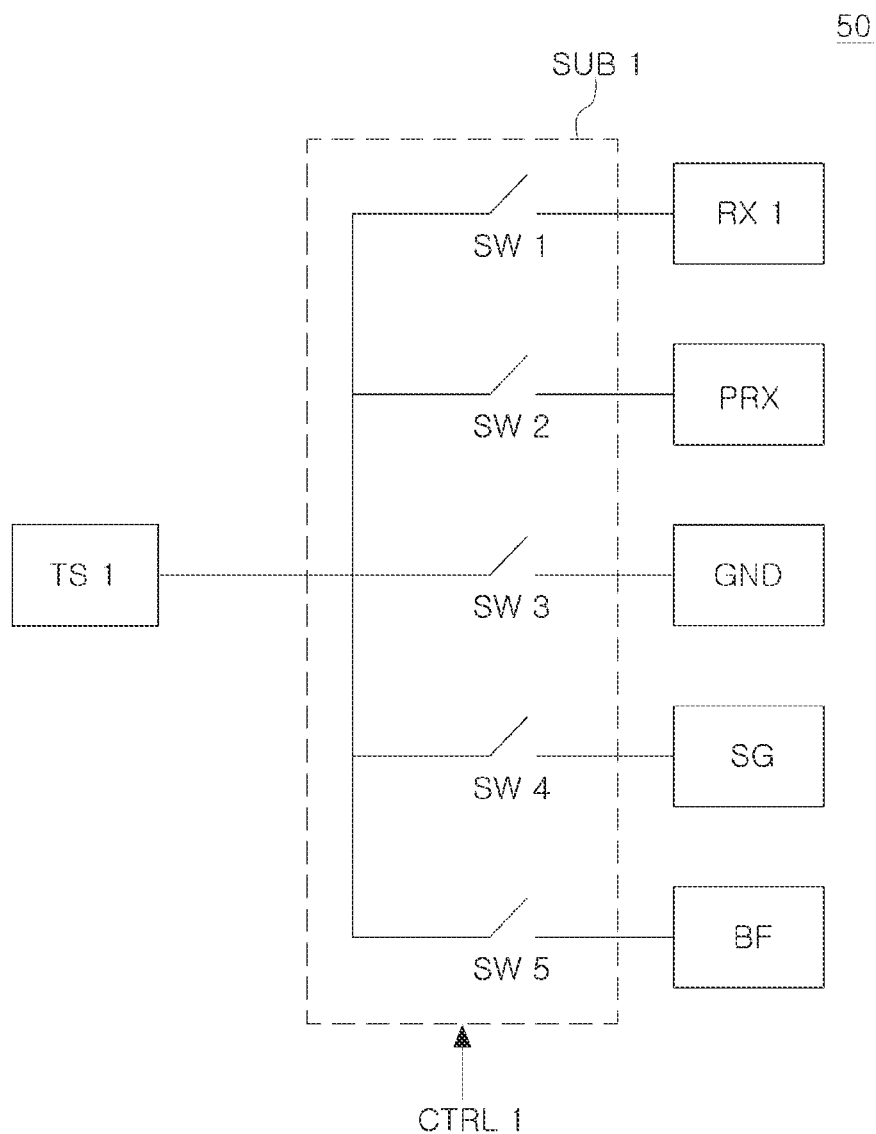

FIGS. 10 and 11 are views illustrating a touch sensing system according to an embodiment. In an embodiments described with reference to FIGS. 10 and 11, it is assumed that touch sensors TS may be arranged in 32 rows and 18 columns. The number of rows and columns may be variously modified.

Referring to FIG. 10, a first multiplexer MUX1 connected to 32 touch sensors TS arranged in a first column C1 may include 32 sub-multiplexers SUB1 to SUB32 corresponding to each of the 32 touch sensors TS. Each of the sub-multiplexers SUB1 to SUB32 may be connected to each of the touch sensors TS arranged in the first column C1.

The first multiplexer MUX1 may be connected to first to $32^{nd}$ touch sensing receivers RX1 to RX32, a proximity sensing receiver PRX, a ground source GND, a voltage source SG for supplying a predetermined voltage, different from a ground voltage, and a buffer BF. Each of the sub-multiplexers SUB1 to SUB32 included in the first multiplexer MUX1 may be connected to corresponding touch sensors TS, and may be connected to touch sensing receivers corresponding to touch sensors TS, among the touch sensing receivers RX1 to RX32.

Each of the sub-multiplexers SUB1 to SUB32 may be connected to a corresponding touch sensing receiver among the touch sensing receivers RX1 to RX32, the proximity sensing receiver PRX, the ground source GND, the voltage source SG for supplying a predetermined voltage, different from a ground voltage, and the buffer BF.

For example, a first sub-multiplexer SUB1 may be connected to a first touch sensor TS1, the first sub-multiplexer SUB1 may be connected to a first touch sensing receiver RX1, the proximity sensing receiver PRX, the ground source GND, the voltage source SG for supplying a predetermined voltage, different from a ground voltage, and the buffer BF. A second sub-multiplexer SUB2 may be connected to a second touch sensor TS2, and the second sub-multiplexer SUB2 may be connected to a second touch sensing receiver RX2, the proximity sensing receiver PRX, the ground source GND, the voltage source SG for supplying a predetermined voltage, different from a ground voltage, and the buffer BF. A $32^{nd}$ sub-multiplexer SUB32 may be connected to a $32^{nd}$ touch sensor TS32, and the $32^{nd}$ sub-multiplexer SUB32 may be connected to a $32^{nd}$ touch sensing receiver RX32, the proximity sensing receiver PRX, the ground source GND, the voltage source SG for supplying a predetermined voltage, different from a ground voltage, and the buffer BF.

Referring to FIG. 11, a first sub-multiplexer SUB1 may include a plurality of switches SW1 to SW5. The first sub-multiplexer SUB1 may control a turn-on or a turn-off of each of the plurality of switches SW1 to SW5 based on a first control signal CTRL1 output from a touch controller.

For example, the first sub-multiplexer SUB1 may turn on the first switch SW1 and turn off the remaining switches SW2 to SW5 based on the first control signal CTRL1. Therefore, a first touch sensor TS1 may be connected to a first touch sensing receiver RX1.

According to an embodiment, the first sub-multiplexer SUB1 may turn on the second switch SW2 and may turn off the remaining switches SW1, SW3, SW4, and SW5 based on the first control signal CTRL1. Therefore, the first touch sensor TS1 may be connected to a proximity sensing receiver PRX by the first sub-multiplexer SUB1.

According to an embodiment, the first sub-multiplexer SUB1 may turn on the third switch SW3 and may turn off the remaining switches SW1, SW2, SW4, and SW5 based on the first control signal CTRL1. Therefore, the first touch sensor TS1 may be connected to a ground source GND by the first sub-multiplexer SUB1.

According to an embodiment, the first sub-multiplexer SUB1 may turn on the fourth switch SW4 and may turn off the remaining switches SW1, SW2, SW3, and SW5 based on the first control signal CTRL1. Therefore, the first touch sensor TS1 may be connected, by the first sub-multiplexer SUB1, to a voltage source SG for supplying a predetermined voltage, different from a ground voltage.

According to an embodiment, the first sub-multiplexer SUB1 may turn on the fifth switch SW5 and may turn off the remaining switches SW1, SW2, SW3, and SW4 based on the first control signal CTRL1. Therefore, the first touch sensor TS1 may be connected to a buffer BF by the first sub-multiplexer SUB1.

According to an embodiment, the first sub-multiplexer SUB1 may turn off all of the switches SW1 to SW5 based on the first control signal CTRL1. Therefore, the first touch sensor TS1 connected to the first sub-multiplexer SUB1 may be floated.

Each of the second to $32^{nd}$ sub-multiplexers SUB2 to SUB32 of FIG. 10 may include the plurality of switches SW1 to SW5, in a similar manner to the first sub-multiplexer SUB1. Each of the second to $32^{nd}$ sub-multiplexers SUB2 to SUB32 of FIG. 10 may control routing of the touch sensor TS connected to each of the sub-multiplexers SUB2 to SUB32 based on a control signal outputted from the touch controller, in a manner similar to the first sub-multiplexer SUB1 of FIG. 11.

In addition, each of the remaining multiplexers MUX2 to MUX18 may also include 32 sub-multiplexers, in a manner similar to the first multiplexer MUX1 of FIG. 10. Each of the sub-multiplexers may control the routing of the touch sensor connected to each of the sub-multiplexers based on a control signal output from the touch controller in a manner similar to the sub-multiplexer of FIG. 11.

Each of the multiplexers MUX1 to MUXn included in the switching unit 120A according to an embodiment may independently control the routing of each of the touch sensors TS disposed on the touch panel 110A. Therefore, the switching unit 120A may electrically connect and group at least two touch sensors TS, adjacent to each other, among the plurality of touch sensors TS. The switching unit 120A may implement a proximity sensing function, without a separate proximity sensor, by connecting the grouped touch sensors TS to the proximity sensing receiver PRX in common.

FIGS. 12 and 13A to 13C are views illustrating a proximity sensing operation of a touch sensing system according to an embodiment.

Figure 12:
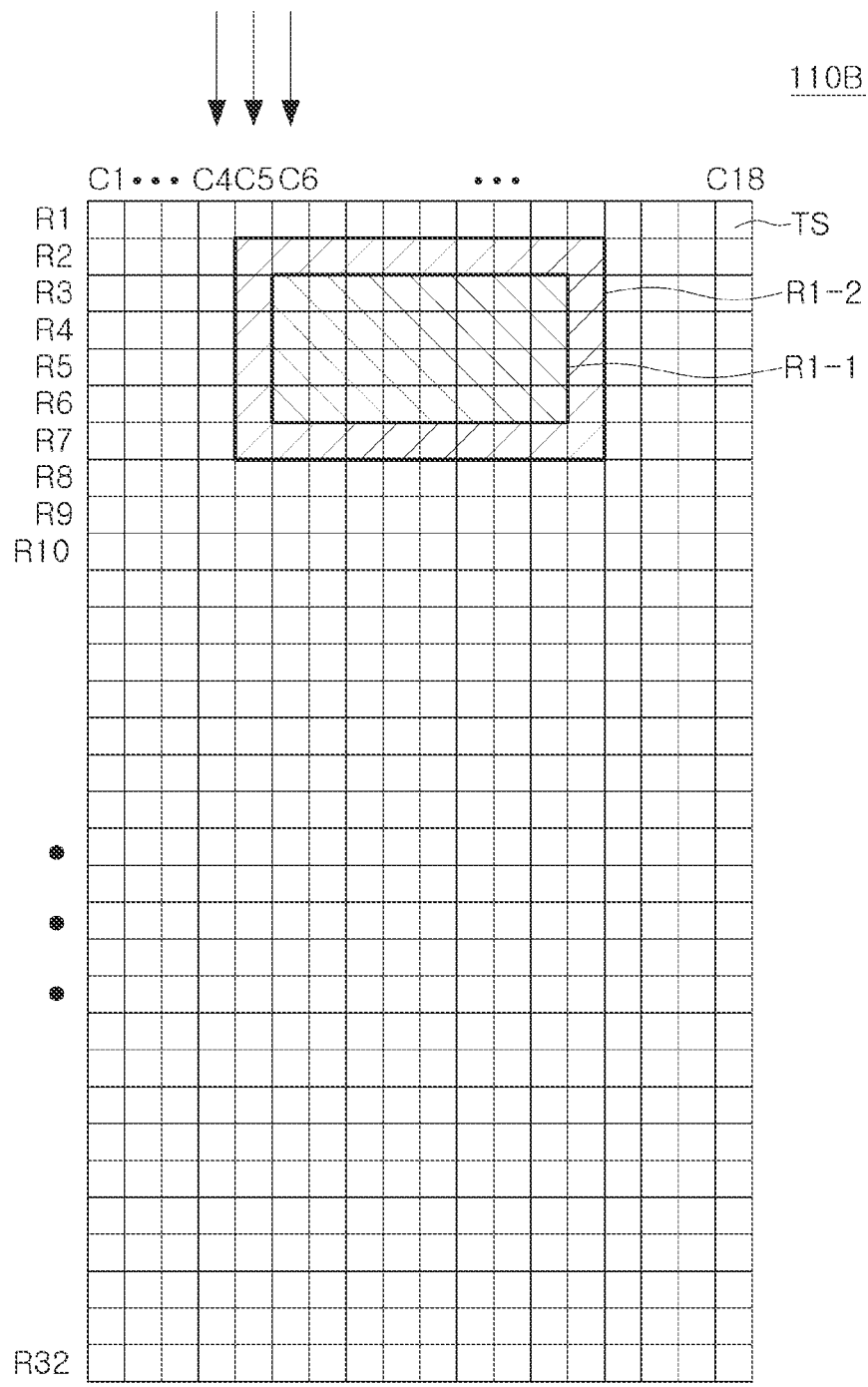
FIGS. 12 and 13A, 13B and 13C are views illustrating a proximity sensing operation of a touch sensing system according to an embodiment.

Referring to FIG. 12, in a touch mode, a switching unit may electrically connect and group at least two touch sensors TS, adjacent to each other, among a plurality of touch sensors TS. The grouped touch sensors TS may be arranged in a first region R1-1 of a touch panel 110B.

In a first embodiment, the touch sensors TS of the first region R1-1 in the touch panel 110B may perform a proximity sensing function, and each of the touch sensors TS of remaining regions, except for the first region R1-1, may be floated, may be connected to a touch sensing receiver to sense a touch input, may be connected to a ground source, may be connected to a voltage source for supplying a predetermined voltage, different from a ground voltage, or may be connected to a buffer.

In a second embodiment, the touch sensors TS of the first region R1-1 in the touch panel 110B may perform a proximity sensing function, each of the touch sensors TS of a second region R1-2, surrounding the first region R1-1, may be connected to a buffer, and each of the touch sensors TS of remaining regions, except for the first region R1-1 and the second region R1-2, may be floated, may be connected to a touch sensing receiver to sense a touch input, may be connected to a ground source, may be connected to a voltage source for supplying a predetermined voltage, different from the ground voltage, or may be connected to the buffer.

The switching unit may freely form shapes, areas, positions, and states of the grouped touch sensors TS. For example, the switching unit may form shapes of the grouped touch sensors TS in a circle, an ellipse, a polygon, a loop, or the like.

As illustrated in FIG. 12, the grouped touch sensors TS may be arranged in the first region R1-1 of the touch panel 110B. According to an embodiment, in the touch panel 110B, a second region R1-2, surrounding the first region R1-1, and remaining regions, except for the first region R1-1 and the second region R1-2, may be determined, in accordance with control of the switching unit.

Each of the touch sensors TS included in the second region R1-2 may be connected to the buffer BF outputting a reference voltage. An electric field radiated from the touch sensors TS of the second region R1-2 may enhance straightness of an electric field radiated from the touch sensors TS of the first region R1-1.

For example, an electric field radiated from the touch sensors TS of the second region R1-2 serves to guard an electric field radiated from the touch sensors TS of the first region R1-1. Therefore, the second region R1-2 may be a shielding region for the touch sensors TS of the first region R1-1.

Figure 13A:
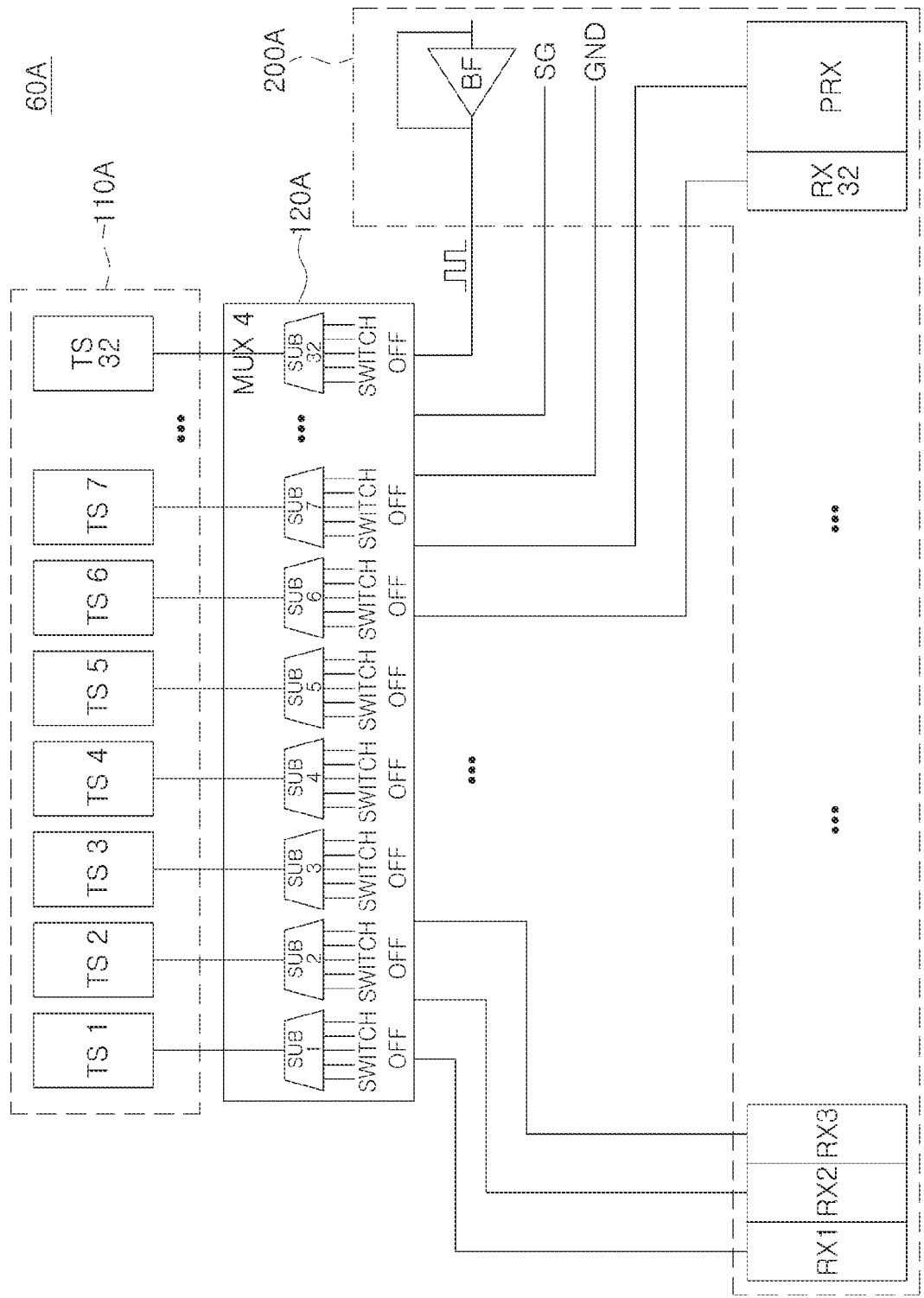

Referring to FIGS. 12 and 13A together, when a touch controller 200A scans a fourth column C4, all touch sensors TS1 to TS32 arranged in the fourth column C4 may be in a floating state. In this case, all the switches included in each sub-multiplexers SUB1 to SUB32 included in a fourth multiplexer MUX4 may be turned off.

Figure 13B:
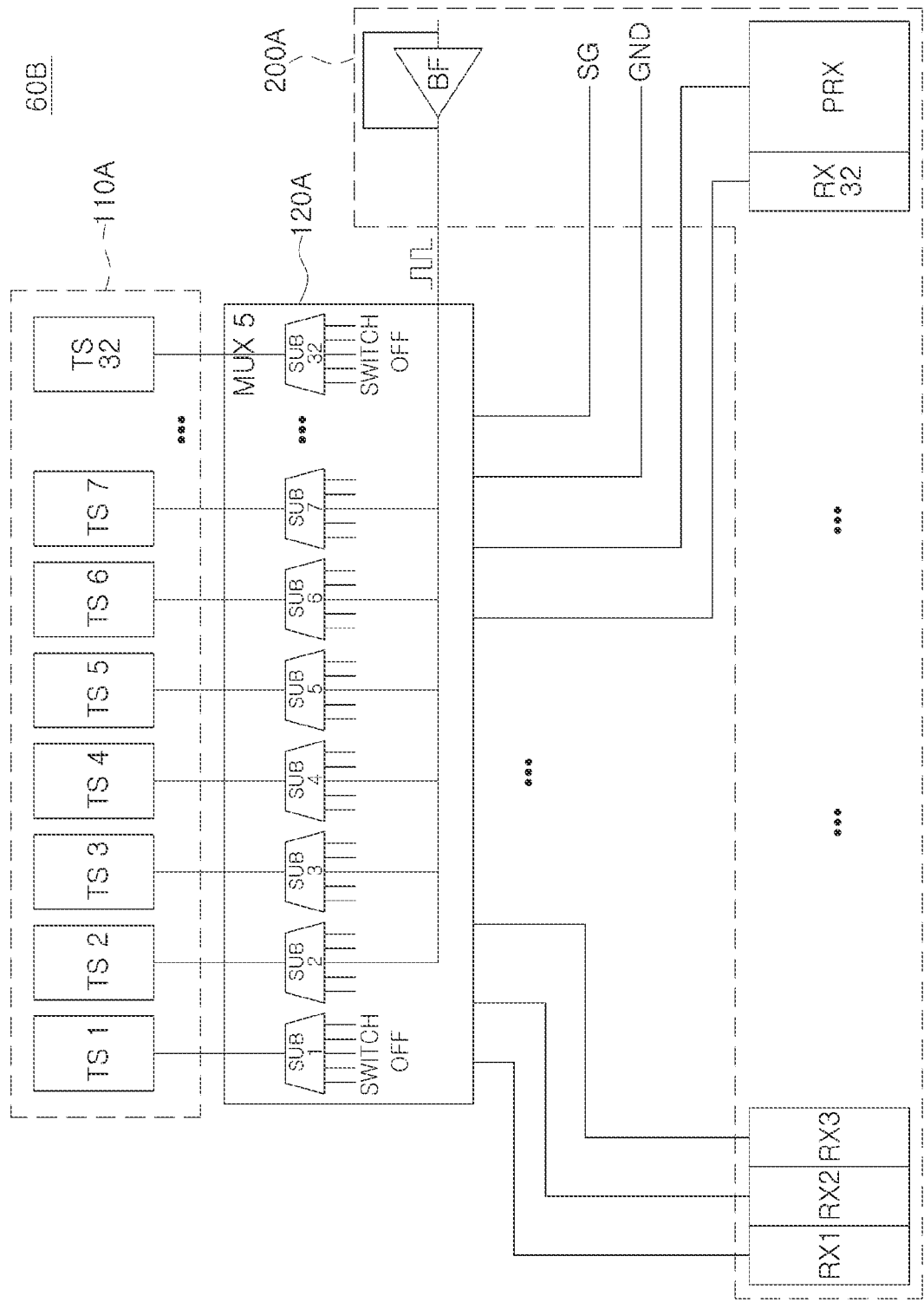

Referring to FIGS. 12 and 13B together, when the touch controller 200A scans a fifth column C5, the first touch sensor TS1 disposed in a region in which the fifth column C5 and a first row R1 cross each other may be in a floating state. In this case, all the switches included in the first sub-multiplexer SUB1, connected to the first touch sensor TS1, among the sub-multiplexers SUB1 to SUB32 included in a fifth multiplexer MUX5, may be turned off.

The touch sensors TS2 to TS7 arranged in a region in which the fifth column C5 and second to seventh rows R2 to R7 cross each other may guard an electric field radiated from the touch sensors TS of the first region R1-1. In this case, among the switches included in each of the second to seventh sub-multiplexers SUB2 to SUB7, the switch for controlling connection between each of the second to seventh touch sensors TS2 to TS7 and the buffer BF may be turned on. Therefore, the touch sensors TS2 to TS7 connected to the second to seventh sub-multiplexers SUB2 to SUB7 may be connected to the buffer BF.

The remaining touch sensors TS8 to TS32 arranged in the fifth column C5 may be in a floating state. In this case, all of the switches included in each of the remaining sub-multiplexers SUB8 to SUB32 may be turned off.

Figure 13C:
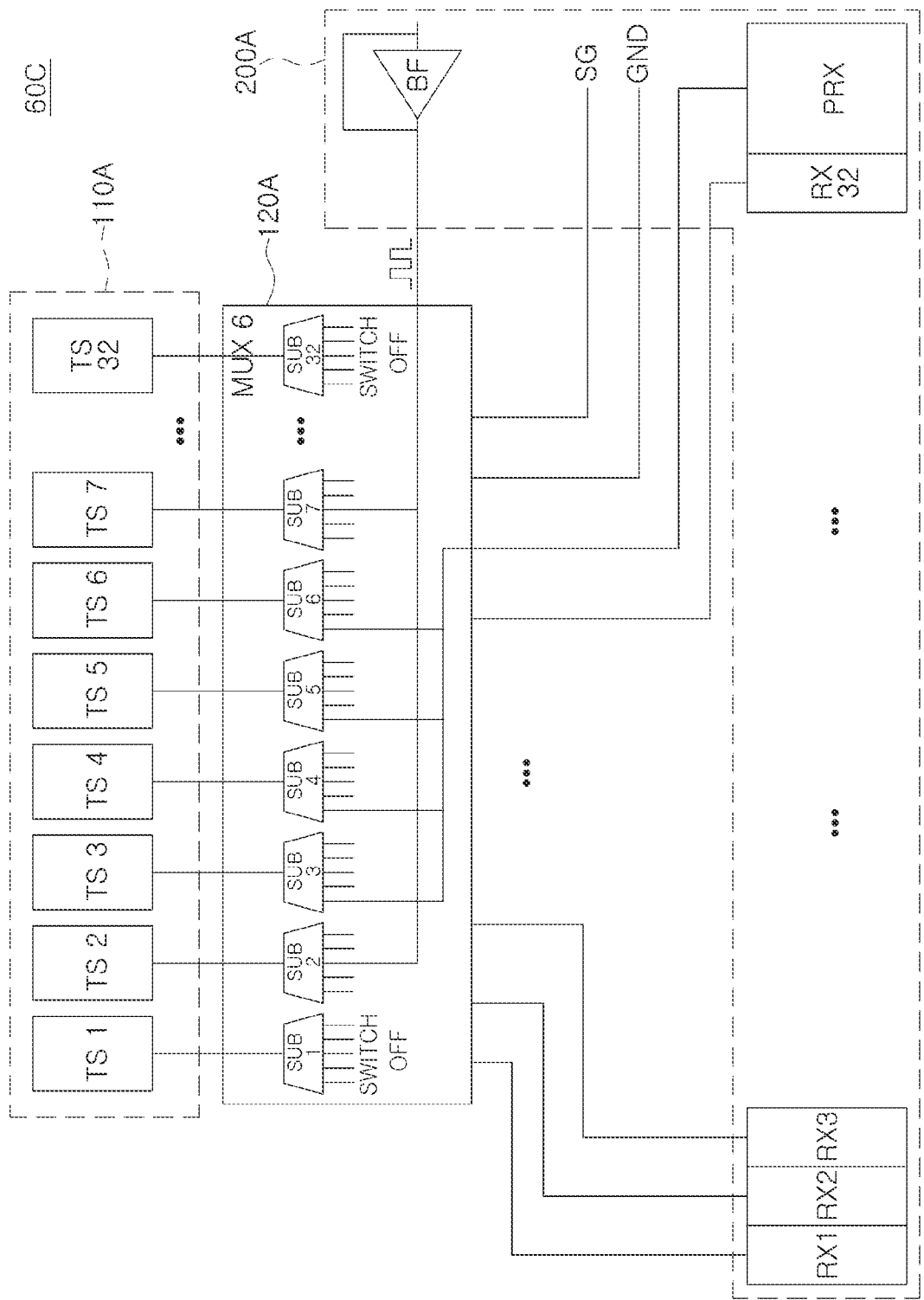

Referring to FIGS. 12 and 13C together, when the touch controller 200A scans a sixth column C6, the first touch sensor TS1 disposed in a region in which the sixth column C6 and the first row R1 cross each other may be in a floating state. In this case, all the switches included in the first sub-multiplexer SUB1, connected to the first touch sensor TS1, among the sub-multiplexers SUB1 to SUB32 included in a sixth multiplexer MUX6, may be turned off.

The second and seventh touch sensors TS2 and TS7 arranged in a region in which the sixth column C6 and the second row R2 and the seventh row R7 cross each other may guard an electric field radiated from the touch sensors TS of the first region R1-1. In this case, among the switches included in each of the second and seventh sub-multiplexers SUB2 and SUB7, the switch for controlling connection between each of the second and seventh touch sensors TS2 to TS7 and the buffer BF may be turned on. Therefore, the touch sensors TS2 and TS7 connected to the second and seventh sub-multiplexers SUB2 and SUB7 may be connected to the buffer BF.

The third to sixth touch sensors TS3 to TS6 arranged in a region in which the sixth column C6 and the third to sixth rows R3 to R6 cross each other may be grouped to perform the proximity sensing function. In this case, among the switches included in each of the third to sixth sub-multiplexers SUB3 to SUB6, a switch for controlling connection between each of the third to sixth touch sensors TS3 to TS6 and the proximity sensing receiver PRX, may be turned on. Therefore, the touch sensors TS3 to TS6 connected to the third to sixth sub-multiplexers SUB3 to SUB6 may be electrically connected and grouped, and the grouped touch sensors TS3 to TS6 may be connected to the proximity sensing receiver PRX in common.

The remaining touch sensors TS8 to TS32 arranged in the sixth column C6 may be in a floating state. In this case, all of the switches included in the remaining sub-multiplexers SUB8 to SUB32 may be turned off.

Figure 14A:
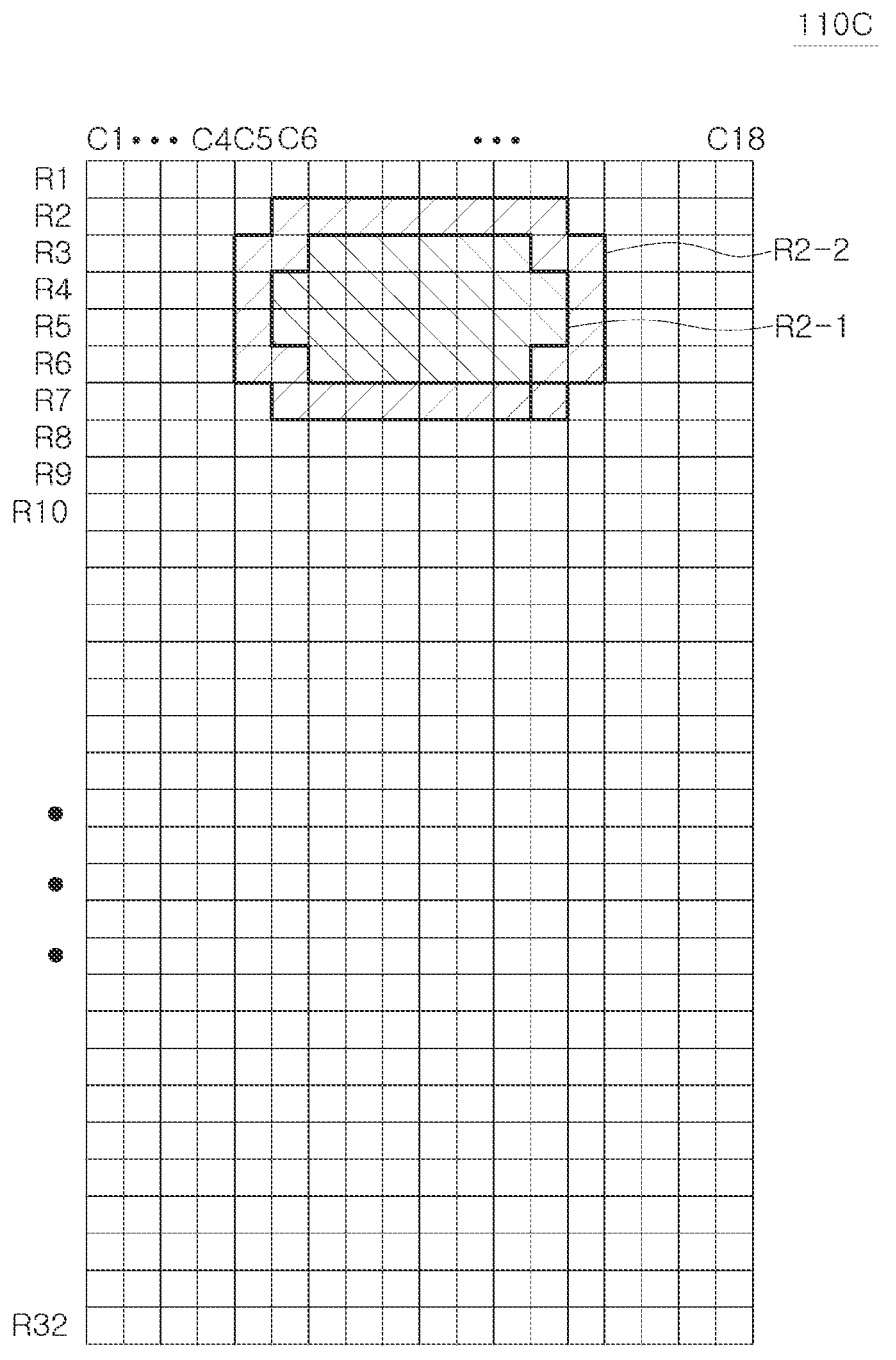
Figure 14B:
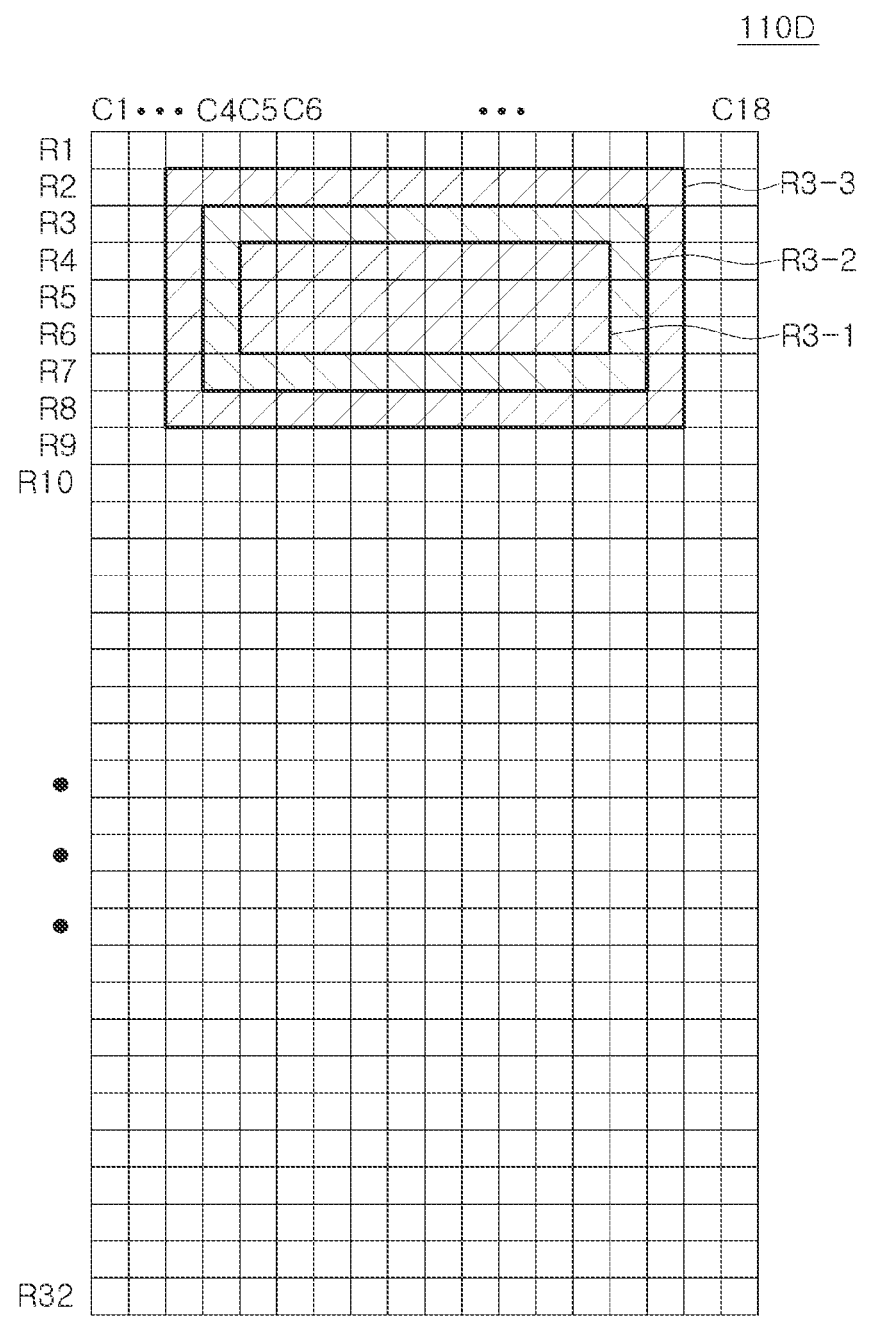
Figure 14C:
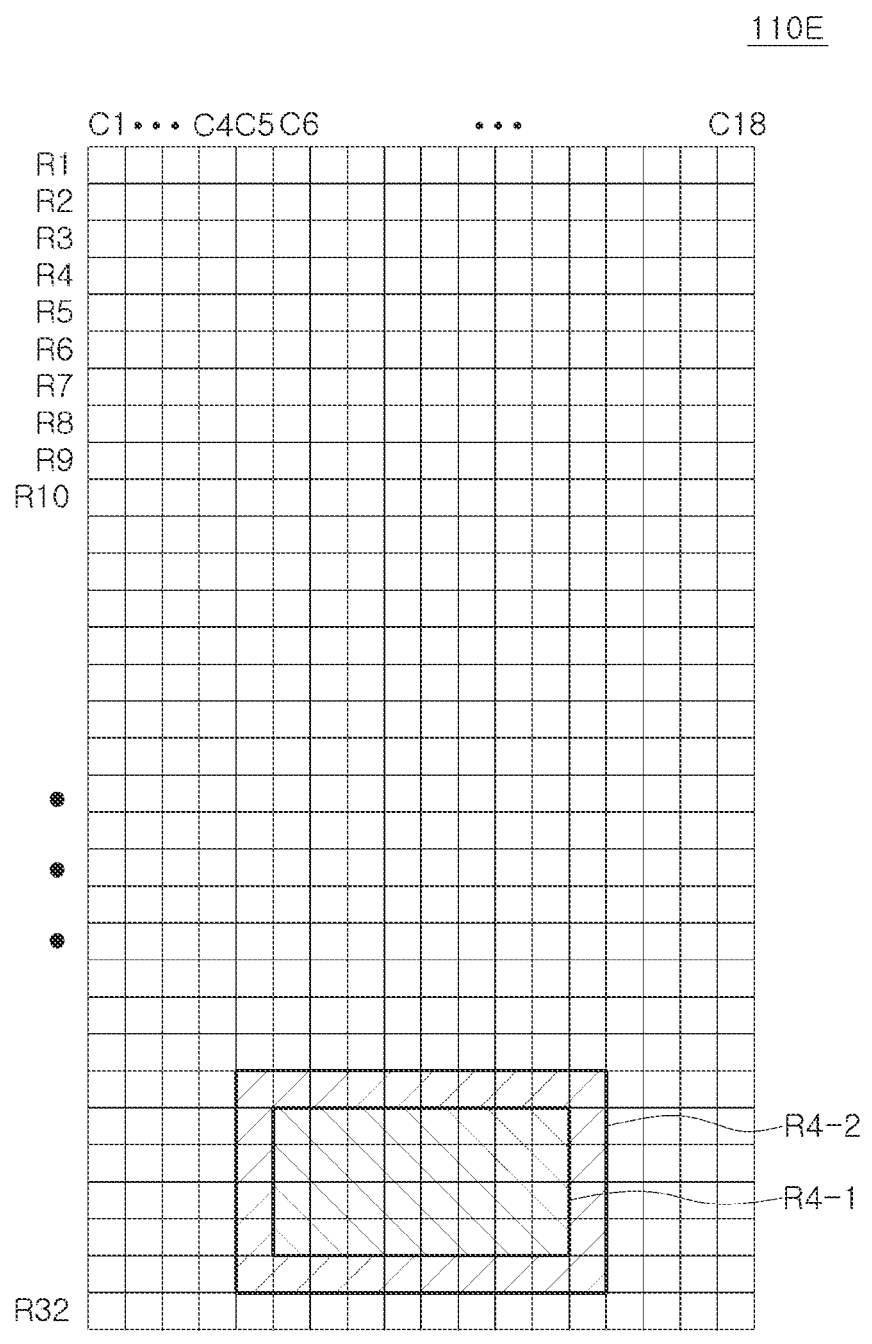
Figure 14D:
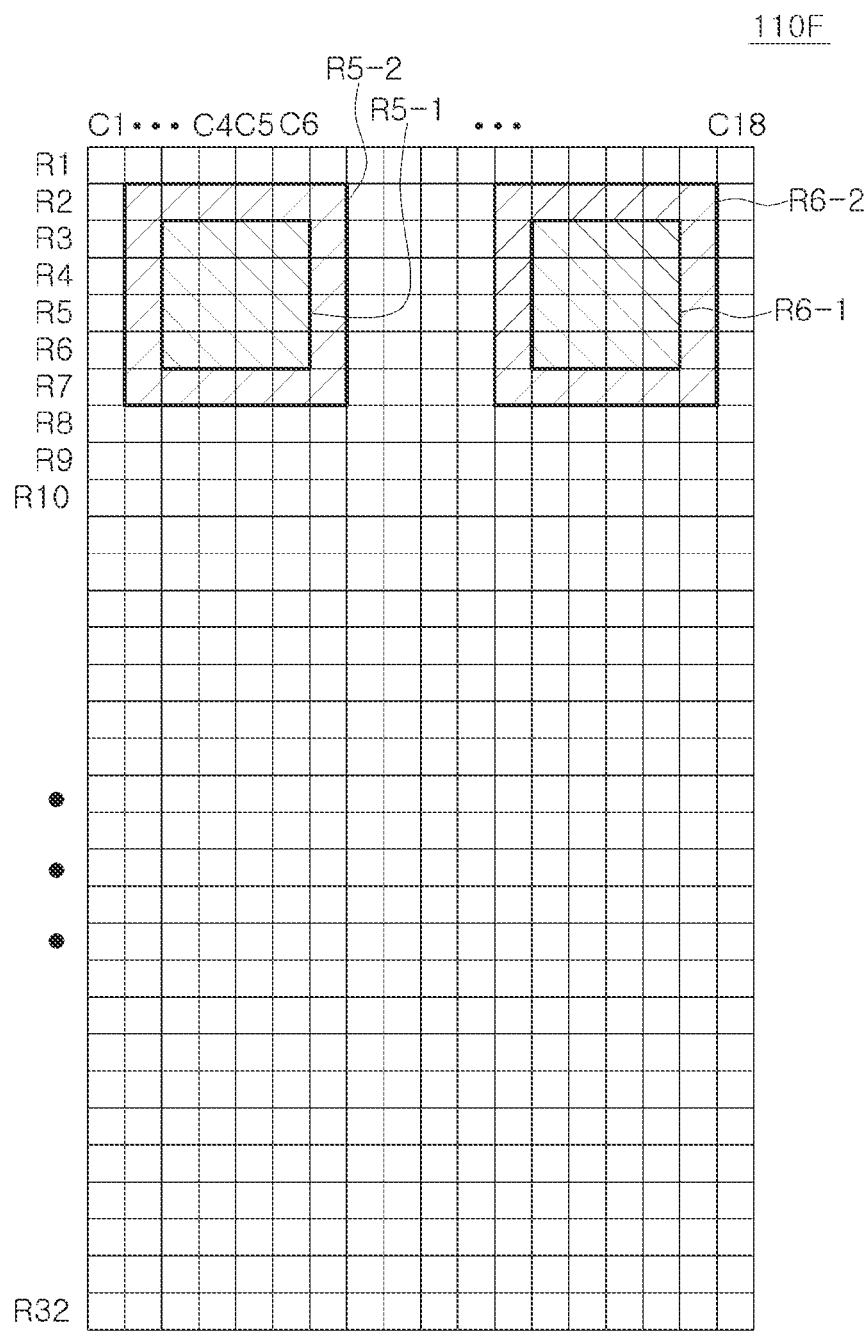

FIGS. 14A to 14G are views illustrating a proximity sensing operation of a touch sensing device according to an embodiment. Referring to FIG. 14A, a touch panel 110C may include a first region R2-1, a second region R2-2, and remaining regions, excluding the first region R2-1 and the second region R2-2. The first region R2-1 may perform a proximity sensing function, and the second region R2-2 may be a shielding region for touch sensors TS of the first region R2-1. Each touch sensor TS in the remaining regions may be floated, may be connected to a touch sensing receiver to sense a touch input, may be connected to a ground source, may be connected to a voltage source for supplying a predetermined voltage, different from a ground voltage, or may be connected to a buffer.

The touch panel 110C may prevent electromagnetic interference (EMI) by excluding touch sensors TS of a corner portion of the second region R2-2 from the second region R2-2.

Referring to FIG. 14B, a touch panel 110D may include a first region R3-1, a second region R3-2, a third region R3-3, and remaining regions, excluding the first region R3-1, the second region R3-2, and the third region R3-3. The second region R3-2 may perform a proximity sensing function, and the first region R3-1 and the third region R3-3 may be shielding regions for touch sensors TS of the second region R3-2. Each touch sensors TS of the remaining regions may be floated, may be connected to a touch sensing receiver to sense a touch input, may be connected to a ground source, may be connected to a voltage source for supplying a predetermined voltage, different from a ground voltage, or may be connected to a buffer.

The touch panel 110D may further improve sensitivity of proximity sensing by implementing the touch sensors TS performing the proximity sensing function in a loop shape.

Referring to FIG. 14C, a first region R4-1 for performing a proximity sensing function, and a second region R4-2, a shielding region for touch sensors TS included in the first region R4-1, may be positioned in a lower end portion of a touch panel 110E.

Referring to FIG. 14D, a touch panel 110F may include a first region R5-1 for performing a proximity sensing function, a second region R5-2 that may be a shielding region for touch sensors TS included in the first region R5-1, a third region R6-1 for performing a proximity sensing function, and a fourth region R6-2 that may be a shielding region for touch sensors TS included in the third region R6-1.

A deviation between a sensing signal output from the first region R5-1 and a sensing signal output from the third region R6-1 may be used to remove a noise of the sensing signals by arranging the first region R5-1 and the third region R6-1, performing the proximity sensing function in the touch panel 110F, on left and right sides of the touch panel 110F.

Figure 14E:
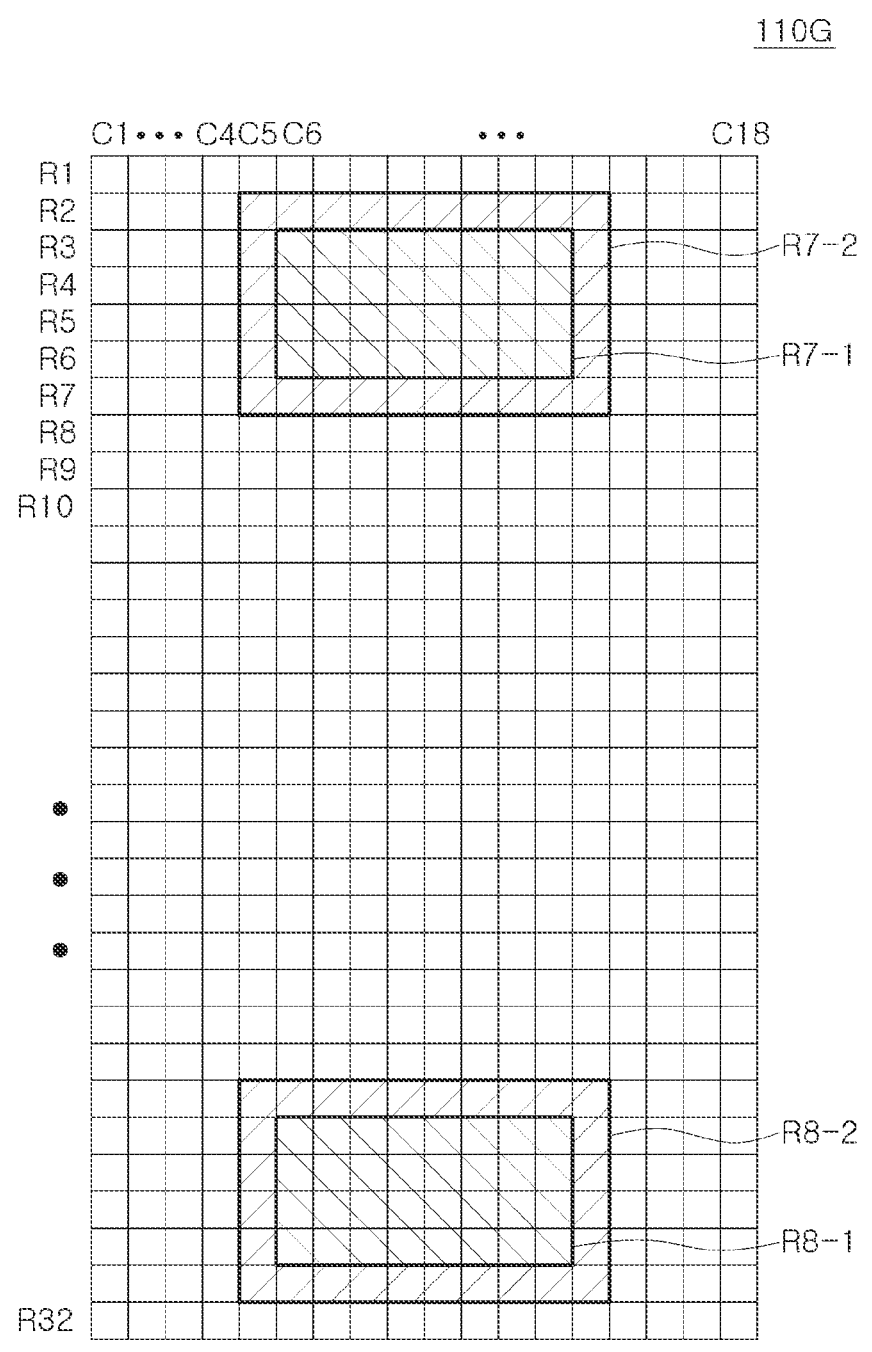

Referring to FIG. 14E, a touch panel 110G may include a first region R7-1 for performing a proximity sensing function, a second region R7-2 that may be a shielding region for touch sensors TS included in the first region R7-1, a third region R8-1 for performing a proximity sensing function, and a fourth region R8-2 that may be a shielding region for touch sensors TS included in the third region R8-1.

The first region R7-1 and the third region R8-1 for performing the proximity sensing function in the touch panel 110G may be arranged on both upper and lower sides of the touch panel 110G.

Figure 14F:
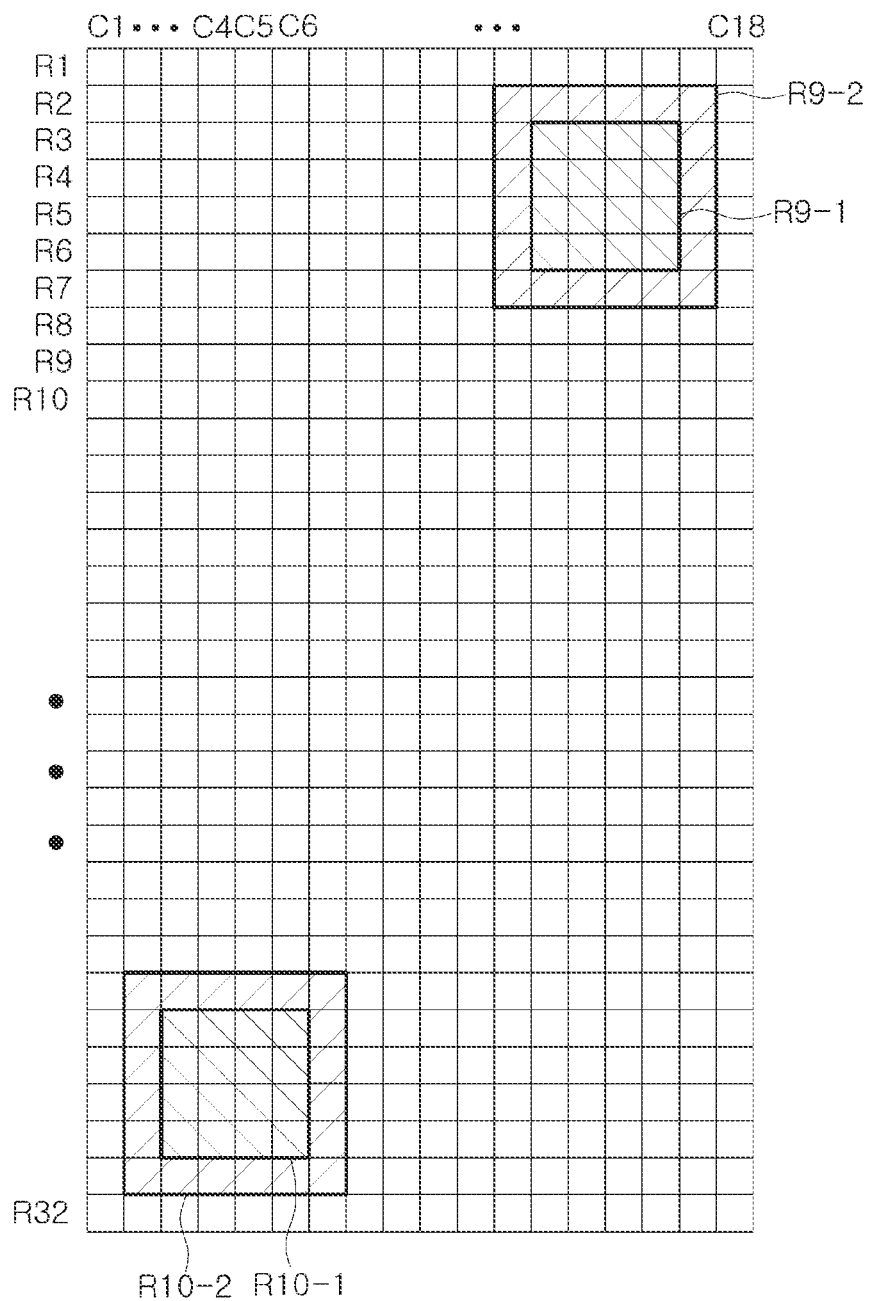

Referring to FIG. 14F, a touch panel 110H may include a first region R9-1 for performing a proximity sensing function, a second region R9-2 that may be a shielding region for touch sensors TS included in the first region R9-1, a third region R10-1 for performing a proximity sensing function, and a fourth region R10-2 that may be a shielding region for touch sensors TS included in the third region R10-1.

The first region R9-1 for performing the proximity sensing function in the touch panel 110H may be disposed on an upper right side of the touch panel 110H, and the third region R10-1 may be disposed on a lower left side of the touch panel 110H.

Figure 14G:
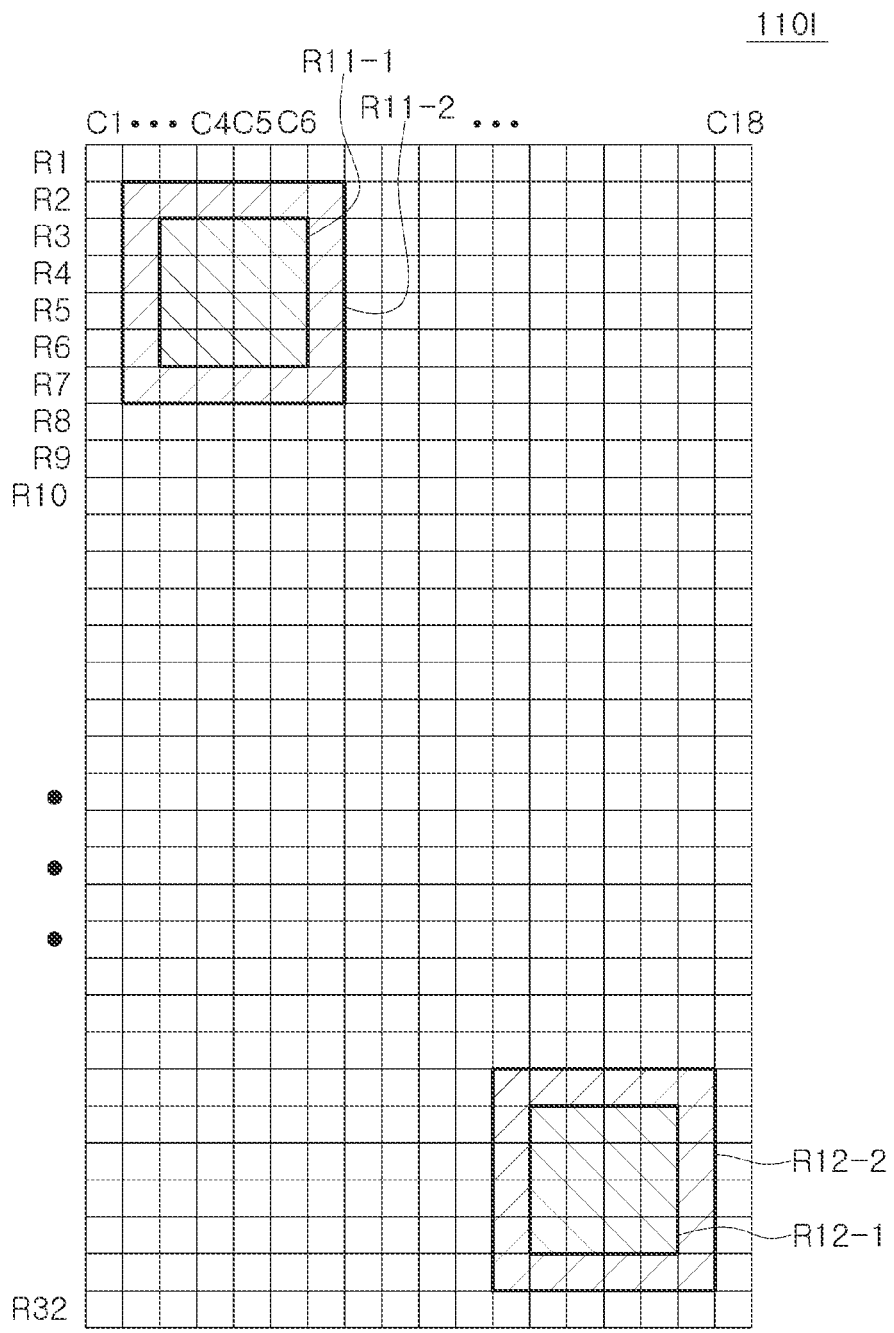

Referring to FIG. 14G, a touch panel 110I may include a first region R11-1 for performing a proximity sensing function, a second region R11-2 that may be a shielding region for touch sensors TS included in the first region R11-1, a third region R12-1 for performing a proximity sensing function, and a fourth region R12-2 that may be a shielding region for touch sensors TS included in the third region R12-1.

The first region R11-1 for performing the proximity sensing function in the touch panel 110I may be disposed on an upper left side of the touch panel 110I, and the third region R12-1 may be disposed on a lower right side of the touch panel 110I.

Figure 15:
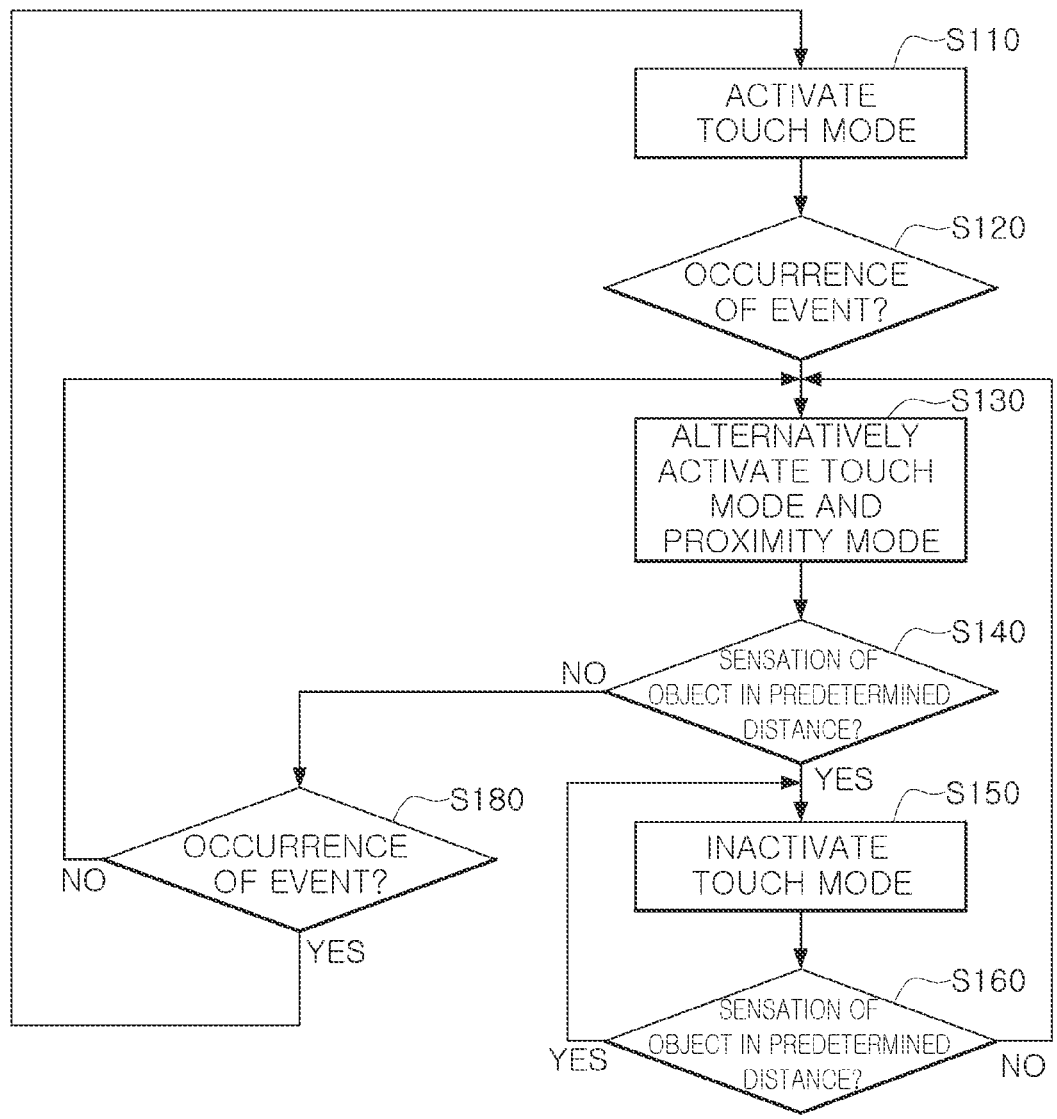
FIG. 15 is a flowchart illustrating a method of operating a display system according to an embodiment.

FIG. 15 is a flowchart illustrating a method of operating a display system according to an embodiment, and FIGS. 16A to 16D are views illustrating a method of operating a display system according to an embodiment. Referring to FIG. 15 and FIGS. 16A to 16D together, a touch mode for displaying an image and sensing a touch input of an object in a display system may be activated (S110).

Figure 16A:
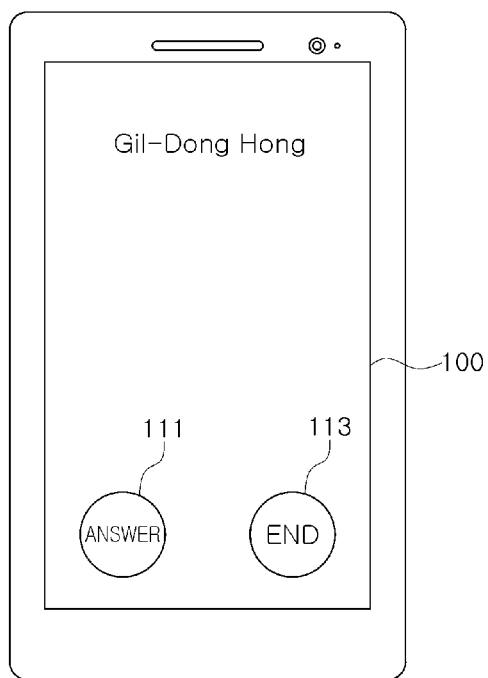
FIGS. 16A, 16B, 16C and 16D are views illustrating a method of operating a display system according to an embodiment.

As illustrated in FIG. 16A, a touch mode is activated in S110 when an incoming call is received, an answer button 111 and an end button 113 may be displayed on a touch display panel 100, but the present disclosure is not limited thereto. When a user clicks (or touches) the answer button 111 to answer the incoming call (S120), the display system may activate the touch mode and a proximity mode (S130).

Figure 16B:
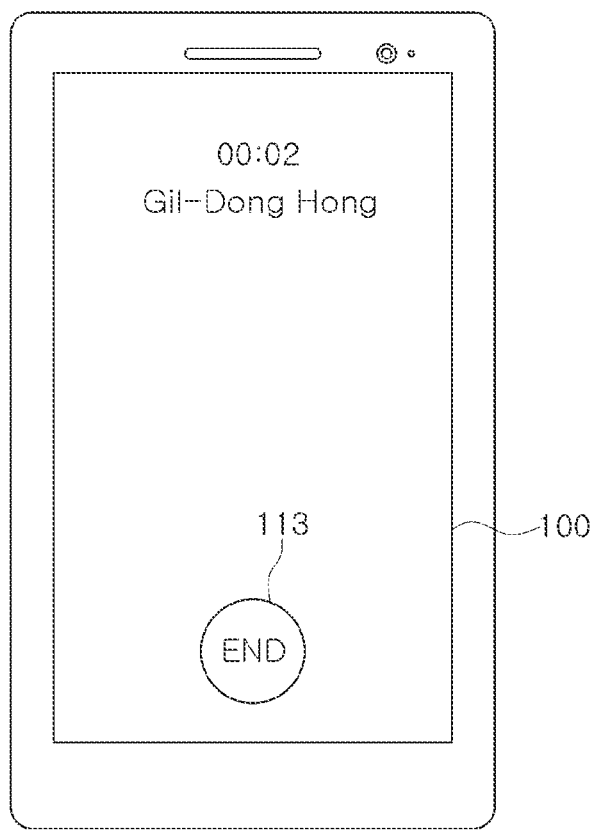

The proximity mode may be a mode for sensing proximity to the object. As illustrated in FIG. 16B, the end button 113 may be displayed on a touch display panel 100 in the proximity mode, but the present disclosure is not limited thereto. In the proximity mode, the display system may electrically connect and group at least two touch sensors adjacent to each other, among the touch sensors included in the display panel. The display system may connect the grouped touch sensors to a proximity sensing receiver. Therefore, the grouped touch sensors may sense proximity to the object.

Figure 16C:
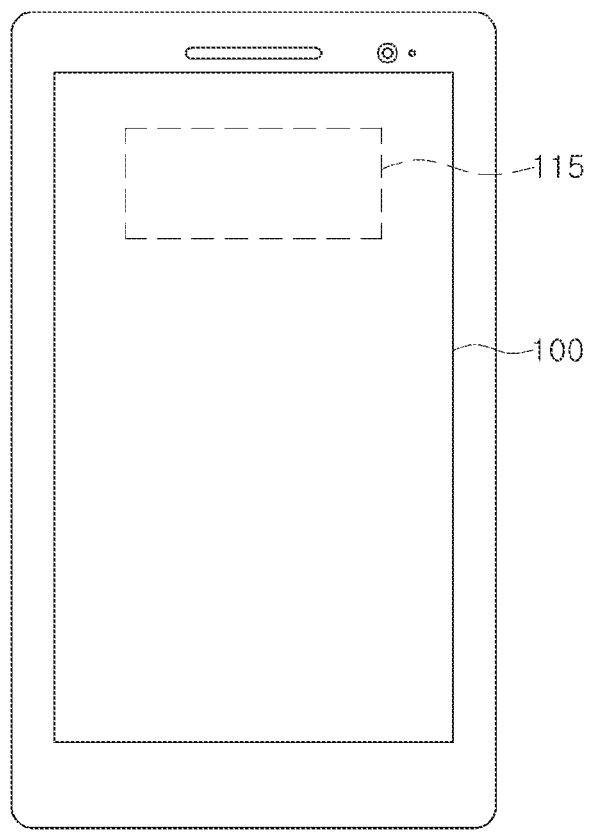

While the touch mode and the proximity mode are activated in S130, the display system may determine whether the object exists within a predetermined distance (S140). In S140, when the display system senses the object within the predetermined distance, the display system may inactivate the touch mode and may activate only the proximity mode (S150). Because only the proximity mode is activated in the display system, the display system may not display image information, as illustrated in FIG. 16C, while the user continues the call. Touch sensors 115 grouped in the touch display panel 100 may sense proximity to the object.

While the user continues the call, the display system may determine whether the object may be sensed within the predetermined distance (S160). When the display system does not sense the object within the predetermined distance in S160, the display system may again activate the touch mode and the proximity mode (S130).

Figure 16D:
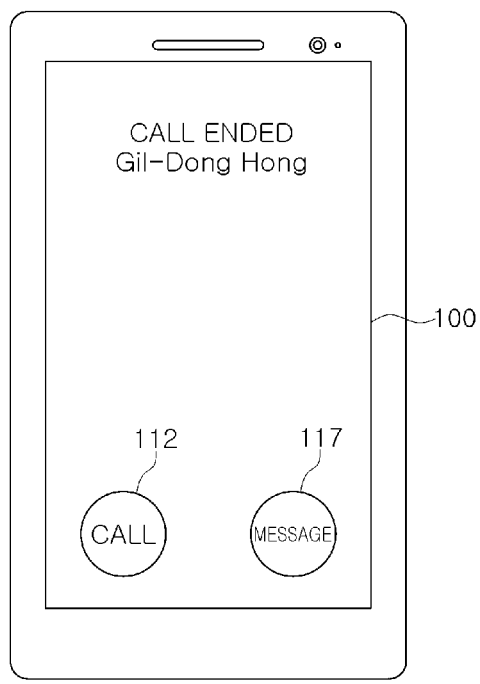

When the display system does not sense the object within the predetermined distance in S140 ("NO" in S140), and the user clicks (or touches) the end button 113 of FIG. 16B to end the call (S180), only the touch mode may be activated (S110). A call button 112 and a message button 117 may be displayed on the display panel 100 as illustrated in FIG. 16D, but the present disclosure is not limited thereto.

While the touch mode and the proximity mode are activated in S130, when the display system does not sense the object within the predetermined distance (S140), and the user does not click (or touch) the end button to end the call (S180), the display system may continuously activate the touch mode and the proximity mode.

Figure 17:
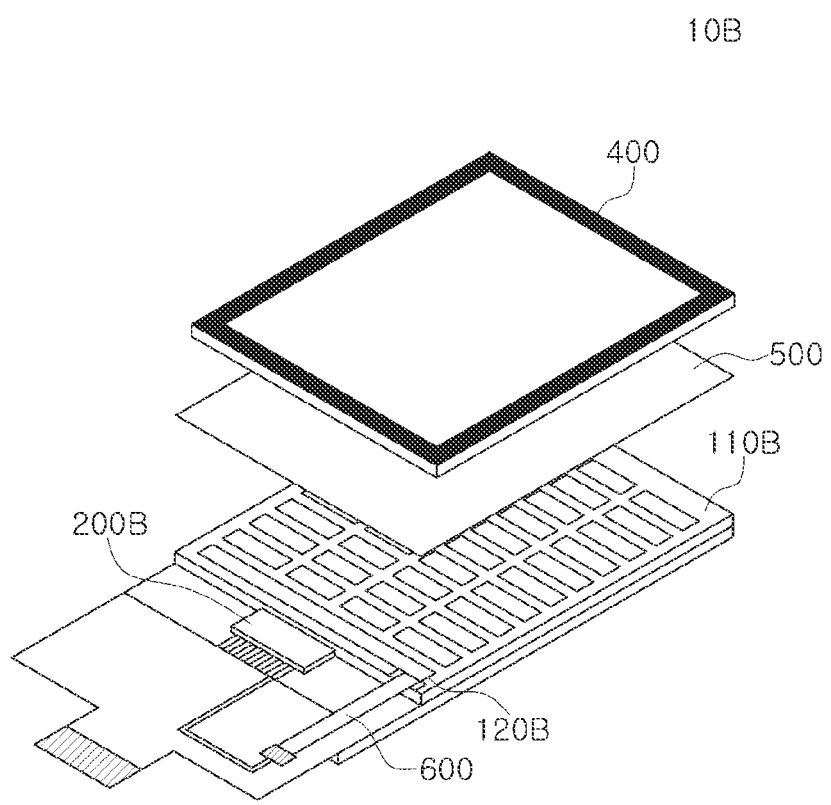
FIG. 17 is a view illustrating a display system equipped with a touch sensing device according to an embodiment.

FIG. 17 is a view illustrating a display system equipped with a touch sensing device according to an embodiment. FIG. 17 is a view illustrating a structure of a display system in which a touch sensing device and a display panel are integrated according to an example embodiment. As illustrated in FIG. 17, a display system 10B may include a window glass 400, a display panel 110B, and a polarizing plate 500.

Particularly, according to an embodiment, a touch sensing device may be formed integrally with the display panel 110B by patterning a transparent electrode on an upper plate of the display panel 110B, instead of being formed on a separate glass substrate. In addition, a switching unit 120B of the touch sensing device may be formed integrally on the display panel 110B.

When the display panel 110B is produced in this manner, a touch controller and a display driving circuit may be integrated in a semiconductor chip 200B. When the touch controller and the display driving circuit are integrated in the single semiconductor chip 200B, the semiconductor chip 200B may include a first pad related to touch data, and a second pad related to an image and gradation data. The semiconductor chip 200B may be connected to the touch sensing device on the display panel 110B through a conductive line 600, and the touch controller integrated in the semiconductor chip 200B may be connected to the switching unit 120B through the conductive line 600.

The touch controller integrated in the semiconductor chip 200B may be designed to be connected to the touch sensors through the switching unit 120B, to reduce the number of pads of the semiconductor chip 200B.

According to an embodiment, a plurality of touch sensors included in a touch panel may be grouped and electrically connected to each other, to perform proximity sensing for sensing proximity of an object. Therefore, according to an embodiment, a full screen display may be implemented.

While example embodiments have been illustrated and described above, it will be apparent to those skilled in the art that modifications and variations could be made without departing from the scope as defined by the appended claims.

What is claimed is:

1. An operating method of a display system configured to include a touchscreen display panel and a controller configured to control the touchscreen display panel, comprising:
    activating a touch mode for displaying an image and sensing a touch input of an object;
    determining whether an event has occurred;
    alternatively activating the touch mode and a proximity mode when the event has occurred;
    determining whether the object is present within a predetermined distance;
    inactivating the touch mode when the object is present within the predetermined distance; and
    sensing proximity to the object,
    wherein the touchscreen display panel includes a touch panel having a plurality of touch sensors and a display panel having a plurality of pixels, and
    wherein the touch panel includes a first area configured to perform a proximity sensing operation by at least two touch sensors among the plurality of touch sensors in the proximity mode; a second area configured to shield an electric field radiated from the at least two touch sensors of the first area in the proximity mode; and remaining areas configured to be floated to a touch sensing receiver in the proximity mode.

2. The method of claim 1, wherein the touch mode is activated when an incoming call is received.

3. The method of claim 2, further comprising displaying an answer button and an end button on the touchscreen display panel.

4. The method of claim 1, further comprising an end button on the touchscreen display panel in the proximity mode.

5. The method of claim 4, further comprising electrically connecting and grouping at least two sensors adjacent to each other among touch sensors of the touchscreen display panel in the proximity mode.

6. The method of claim 1, further comprising again activating the touch mode and the proximity mode when the object does not exist within the predetermined distance.

7. The method of claim 1, further comprising continuously activating the touch mode and the proximity mode when the object does not exist within the predetermined distance and a user does not click/touch an end button to end a call.

8. The method of claim 1, wherein the plurality of touch sensors are arranged in a grid along a row direction and a column direction that crosses the row direction, and
    wherein the plurality of touch sensors comprises N (where N is integer)×N touch sensors arranged in a N×N grid.

9. The method of claim 8, wherein the N×N touch sensors are activated in the proximity mode.

10. The method of claim 8, wherein N is 2.

11. A display system, comprising:
    a touchscreen display panel configured to include a touch panel having a plurality of touch sensors and a display panel having a plurality of pixels; and
    a driving integrated circuit configured to control the touchscreen display panel,
    wherein the plurality of touch sensors comprises N (where N is integer)×N touch sensors arranged in a N×N grid,
    wherein the driving integrated circuit activates a touch mode for displaying an image to the display panel and sensing a touch input of an object from the touch panel, and activates a proximity mode when an event has occurred, and
    wherein the touch panel includes, a first area configured to perform a proximity sensing operation by at least two touch sensors among the plurality of touch sensors in the proximity mode; a second area configured to shield an electric field radiated from the at least two touch sensors of the first area in the proximity mode; and remaining areas configured to be floated to a touch sensing receiver in the proximity mode.

12. The display system of claim 11, wherein the touchscreen display panel is implemented in an in-cell type or an on-cell type.

13. The display system of claim 11, wherein the touch panel includes a switching circuit configured to group the touch sensors included in the touch panel into a first group and a second group.

14. The display system of claim 13, wherein the switching circuit electrically connects the first group and the second group in the proximity mode.

15. A driving integrated circuit comprising:
    a display driving circuit configured to control a display panel for displaying an image; and
    a touch controller configured to control a touch panel for sensing a touch input or proximity of an object,
    wherein the touch controller activates a touch mode for displaying the image to the display panel and sensing the touch input of the object from the touch panel; and alternatively activates the touch mode and a proximity mode when an event has occurred, and
    wherein the touch panel includes, a first area configured to perform a proximity sensing operation by at least two touch sensors of the touch panel in the proximity mode; a second area configured to shield an electric field radiated from the at least two touch sensors of the first area in the proximity mode; and remaining areas configured to be floated to a touch sensing receiver in the proximity mode.

16. The driving integrated circuit of claim 15, wherein the touch controller includes:
    at least one transmission circuit configured to output a voltage signal to touch sensors of the touch panel; and
    at least one reception circuit configured to detect the voltage signal from the touch sensors.

17. The driving integrated circuit of claim 16, wherein the touch controller provides a common voltage to a touch sensing line connected to each of the touch sensors.

18. The driving integrated circuit of claim 17, wherein the touch controller receives a touch sensing signal through the touch sensing line from the each of the touch sensors and sense a change in the touch sensing signal.

19. The driving integrated circuit of claim 15, wherein the at least two touch sensors are adjacent to each other,
- wherein the touch controller electrically connects the at least two touch sensors to a proximity sensing receiver in the proximity mode, and
- wherein the proximity sensing receiver is configured to sense the proximity of the object using the at least two touch sensors.

\* \* \* \* \*